United States Patent
Dwarakanath et al.

(10) Patent No.: US 9,909,053 B2
(45) Date of Patent: *Mar. 6, 2018

(54) POLYMER COMPOSITIONS

(71) Applicant: Chevron U.S.A. Inc., San Ramon, CA (US)

(72) Inventors: Varadarajan Dwarakanath, Houston, TX (US); Robert M. Dean, Houston, TX (US); Do Hoon Kim, Katy, TX (US); Dennis Arun Alexis, Houston, TX (US); Sophany Thach, Houston, TX (US); Taimur Malik, Houston, TX (US); Anette Poulsen, Oyne (GB); Sumitra Subrahmanyan, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,069

(22) Filed: Oct. 29, 2015

(65) Prior Publication Data
US 2016/0122622 A1  May 5, 2016

Related U.S. Application Data

(60) Provisional application No. 62/073,174, filed on Oct. 31, 2014, provisional application No. 62/073,179, (Continued)

(51) Int. Cl.
*C09K 8/588* (2006.01)
*C09K 8/584* (2006.01)
(Continued)

(52) U.S. Cl.
CPC .............. *C09K 8/588* (2013.01); *C09K 8/584* (2013.01); *C09K 8/68* (2013.01); *C09K 8/88* (2013.01); *E21B 43/16* (2013.01); *E21B 43/26* (2013.01)

(58) Field of Classification Search
None
See application file for complete search history.

(56) References Cited

U.S. PATENT DOCUMENTS 509,989 A    12/1893   Wilton
3,220,473 A  11/1965   Holm
(Continued)

FOREIGN PATENT DOCUMENTS

WO   2012/170835 A1   12/2012
WO   2014/055158 A1   4/2014
WO   2017/040903 A1   3/2017

OTHER PUBLICATIONS

"Dow Oil & Gas Offerings for EOR Operations, Multi-Functional Chemicals and Materials for Enhanced Performance"; Dow Oil & Gas, Form No. 812-00007-0908; pp. 1-2.
(Continued)

*Primary Examiner* — John J Figueroa

(57) ABSTRACT

Embodiments of a polymer composition are disclosed for use in enhancing the production of oil from a formation. In one embodiment, the composition includes a powder polymer having an average molecular weight of 0.5 to 30 Million Daltons suspended in a water soluble solvent having an HLB of greater than or equal to 8 and selected from the group of surfactants, glycol ethers, alcohols, co-solvents, and mixtures thereof, at a weight ratio of powder polymer to water soluble solvent ranging from 20:80 to 80:20. The polymer composition is substantially anhydrous. The polymer composition is hydrated in an aqueous fluid for an injection solution in less than or equal to 4 hours containing a polymer (Continued)

concentration ranging from 100 ppm to 50,000 ppm and having a filter ratio of less than or equal to 1.5 at 15 psi using a 1.2 μm filter.

30 Claims, 3 Drawing Sheets

Related U.S. Application Data filed on Oct. 31, 2014, provisional application No. 62/073,184, filed on Oct. 31, 2014, provisional application No. 62/213,495, filed on Sep. 2, 2015.

(51) Int. Cl.
*C09K 8/68* (2006.01)
*E21B 43/16* (2006.01)
*E21B 43/26* (2006.01)
*C09K 8/88* (2006.01)

(56) References Cited

U.S. PATENT DOCUMENTS

| | | | |
|---|---|---|---|
| 3,446,282 A | 5/1969 | Cooke, Jr. | |
| 3,601,079 A | 8/1971 | Giles et al. | |
| 3,763,071 A | 10/1973 | Katzer et al. | |
| 4,113,688 A | 9/1978 | Pearson | |
| 4,176,107 A | 11/1979 | Buckman et al. | |
| 4,190,718 A * | 2/1980 | Lorenz | C08F 26/10 428/402 |
| 4,457,373 A | 7/1984 | Balzer et al. | |
| 4,525,515 A | 6/1985 | Peignier et al. | |
| 4,582,138 A | 4/1986 | Balzer | |
| 4,639,322 A | 1/1987 | Beck et al. | |
| 4,931,194 A * | 6/1990 | Pinschmidt, Jr. | C09K 8/588 166/270.1 |
| 4,964,999 A * | 10/1990 | Russo | C09K 8/32 252/363.5 |
| 4,966,235 A | 10/1990 | Gregoli et al. | |
| 5,224,988 A * | 7/1993 | Pirri | C08J 3/03 106/162.1 |
| 5,306,350 A | 4/1994 | Hoy et al. | |
| 5,527,486 A | 6/1996 | De Guertechin | |
| 5,690,174 A | 11/1997 | Chapman et al. | |
| 5,753,738 A | 5/1998 | Chapman et al. | |
| 5,969,012 A | 10/1999 | Harris, Jr. | |
| 6,022,833 A | 2/2000 | Mueller et al. | |
| 6,148,913 A | 11/2000 | Collins | |
| 6,225,263 B1 | 5/2001 | Collins et al. | |
| 6,242,517 B1 | 6/2001 | Christensen et al. | |
| 6,387,853 B1 * | 5/2002 | Dawson | C09K 8/90 507/209 |
| 6,451,743 B1 | 9/2002 | Fox | |
| 6,581,687 B2 | 6/2003 | Collins et al. | |
| 6,939,832 B2 | 9/2005 | Collins | |
| 7,417,010 B2 | 8/2008 | Collins | |
| 7,419,938 B2 | 9/2008 | Collins | |
| 7,524,796 B1 | 4/2009 | Heilman et al. | |
| 7,762,340 B2 | 7/2010 | Pich et al. | |
| 7,770,641 B2 | 8/2010 | Dwarakanath et al. | |
| 8,322,911 B2 | 12/2012 | Pich et al. | |
| 8,383,560 B2 | 2/2013 | Pich et al. | |
| 8,574,873 B2 | 11/2013 | Therre et al. | |
| 8,714,247 B1 | 5/2014 | Berger et al. | |
| 8,853,136 B2 | 10/2014 | Bittner et al. | |
| 2002/0019318 A1 | 2/2002 | Harris | |
| 2003/0022987 A1 * | 1/2003 | Matz | A61K 8/8158 524/814 |
| 2003/0181532 A1 * | 9/2003 | Parris | C09K 8/58 516/20 |
| 2004/0008571 A1 | 1/2004 | Coody et al. | |
| 2004/0136262 A1 | 7/2004 | Wilson | |
| 2006/0276347 A1 * | 12/2006 | Lin | C09K 8/58 507/209 |
| 2009/0203557 A1 | 8/2009 | Barnes et al. | |
| 2011/0146974 A1 * | 6/2011 | Hartshorne | C09K 8/035 166/250.12 |
| 2012/0199356 A1 | 8/2012 | Nichols | |
| 2013/0196885 A1 | 8/2013 | Pabalan et al. | |
| 2014/0116689 A1 | 5/2014 | Bittner et al. | |
| 2016/0122623 A1 | 5/2016 | Dwarakanath et al. | |
| 2016/0122624 A1 | 5/2016 | Dwarakanath et al. | |
| 2016/0122626 A1 | 5/2016 | Dwarakanath et al. | |

OTHER PUBLICATIONS

"Miscibility Characteristics of Glycol Ether/Water Mixtures for Waterborne Coatings"; Phase Equilibria of Eastman EB Solvent/Water; Title pp. (2) and pp. 1-7.
Ahmadi, Mohammad Ali, et al.; "Nonionic Surfactant for Enhanced Oil Recovery from Carbonates: Absorption Kinetics and Equilibrium"; Industrial & Engineering Chemistry Research, vol. 51, (2012), pp. 9894-9905.
Baudin, P., et al.; "Temperature Dependence of Industrial Propylene Glycol Alkyl Ether / Water Mixtures"; Journal of Molecular Liquids, vol. 115, (2004), pp. 23-28.
Bin-Dahbag, Mabkhot S., et al.; "Experimental Study of Use of Ionic Liquids in Enhanced Oil Recovery"; Journal of Petroleum & Environmental Biotechnology, (2014), vol. 4, Issue 6, pp. 1-7.
Cox, Henry L., et al.; "Reciprocal Solubility of the Normal Propyl Ethers of 1,2-Propylene Glycol and Water, Closed Solubility Curves, II"; vol. 49, (Apr. 1927), pp. 1080-1083.
Iglauer, Stefan, et al.; "New Surfactant Classes for Enhanced Oil Recovery and their Tertiary Oil Recovery Potential"; Journal of Petroleum Science and Engineering, vol. 71, (2010), pp. 23-29.
Koh, Heesong; "Experimental Investigation of the Effect of Polymers on Residual Oil Saturation"; Dissertation, (2015), Title page, pp. v-xxv and pp. 1-45.
Koh, Heesong; "Experimental Investigation of the Effect of Polymers on Residual Oil Saturation"; Dissertation, (2015), pp. 46-116.
Koh, Heesong; "Experimental Investigation of the Effect of Polymers on Residual Oil Saturation"; Dissertation, (2015), pp. 117-187.
Koh, Heesong; "Experimental Investigation of the Effect of Polymers on Residual Oil Saturation"; Dissertation, (2015), pp. 188-257.
Levitt, David Benjamin; "The Optimal Use of Enhanced Oil Recovery Polymers Under Hostile Conditions"; Dissertation, (May 2009), Title page, pp. v-xv and pp. 1-50.
Levitt, David Benjamin; "The Optimal Use of Enhanced Oil Recovery Polymers Under Hostile Conditions"; Dissertation, (May 2009), pp. 51-116.
Levitt, David Benjamin; "The Optimal Use of Enhanced Oil Recovery Polymers Under Hostile Conditions"; Dissertation, (May 2009), pp. 117-179.
Magbagbeola, Oluwaseun Adedeji; "Quantification of the Viscoelastic Behavior of High Molecular Weight Polymers used for Chemical Enhanced Oil Recovery"; Thesis, Dec. 2008, Title page, pp. v-xx, and pp. 1-31.
Magbagbeola, Oluwaseun Adedeji; "Quantification of the Viscoelastic Behavior of High Molecular Weight Polymers used for Chemical Enhanced Oil Recovery"; Thesis, Dec. 2008, pp. 32-83.
Magbagbeola, Oluwaseun Adedeji; "Quantification of the Viscoelastic Behavior of High Molecular Weight Polymers used for Chemical Enhanced Oil Recovery"; Thesis, Dec. 2008, pp. 84-135.
Magbagbeola, Oluwaseun Adedeji; "Quantification of the Viscoelastic Behavior of High Molecular Weight Polymers used for Chemical Enhanced Oil Recovery"; Thesis, Dec. 2008, pp. 136-185.
Nassar, Vivian L., et al.; "Solubility of Hydrocarbons in Physical Solvents"; Bryan Research & Engineering, Inc.; (2000), pp. 1-15.
Randall, T.E., et al.; "Recent Developments in Slim Tube Testing for Hydrocarbon-Miscible Flood (HCMF) Solvent Design"; Enhanced Oil Recovery, Nov.-Dec. 1988, vol. 27, No. 6, pp. 33-44.
Seright, R.S., et al.; "Injectivity Characteristics of EOR Polymers"; SPE Reservoir Evaluation & Engineering, Oct. 2009, pp. 783-792.
Wang, Dongmei, et al.; "Enhanced Oil Recovery from the Bakken Shale using Surfactant Imbition Coupled with Gravity Drainage—09123-09"; RPSEA Final Report (09123.11.Final); pp. I-IX and pp. 1-66.

(56) References Cited

OTHER PUBLICATIONS

International Search Report, issued on Jan. 14, 2016, during the prosecution of International Application No. PCT/US15/58136.
Written Opinion of the International Searching Authority, dated Jan. 14, 2016, during the prosecution of International Application No. PCT/US15/58136.
International Search Report, dated Nov. 16, 2016, during the prosecution of International Application No. PCT/US2016/050067.
Written Opinion of the International Searching Authority, dated Nov. 16, 2016, during the prosecution of International Application No. PCT/US2016/050067.
DOW; "Product Information DOW P-Series Glycol Ethers"; Jul. 31, 2002, 6 pages.
DOW; "Production Information Solvent HLB and OHLB Values for DOW Glycol Ethers"; Apr. 5, 2004, pp. 1-2.
"The HLB System a Time-Saving Guide to Emulsifier Selection Anticipating Needs"; Jan. 1, 2004, pp. 1-22.
Extended European Search Report, dated Jul. 27, 2017, during the prosecution of European Application No. 15854612.7.

\* cited by examiner

POLYMER COMPOSITIONS

CROSS REFERENCES TO RELATED APPLICATIONS

This application claims benefit under 35 USC 119 of U.S. Provisional Patent App. No. 62/073,174 with a filing date of Oct. 31, 2014, which is incorporated herein by reference in its entirety and for all purposes. This application claims benefit under 35 USC 119 of U.S. Provisional Patent App. No. 62/073,179 with a filing date of Oct. 31, 2014, which is incorporated herein by reference in its entirety and for all purposes. This application claims benefit under 35 USC 119 of U.S. Provisional Patent App. No. 62/073,184 with a filing date of Oct. 31, 2014, which is incorporated herein by reference in its entirety and for all purposes. This application claims benefit under 35 USC 119 of U.S. Provisional Patent App. No. 62/213,495 with a filing date of Sep. 2, 2015, which is incorporated herein by reference in its entirety and for all purposes.

TECHNICAL FIELD

The present disclosure generally relates to polymer compositions for use in enhanced oil recovery, and systems and methods for preparing and transporting polymer compositions.

BACKGROUND

Reservoir systems, such as petroleum reservoirs, typically contain fluids such as water and a mixture of hydrocarbons such as oil and gas. To remove ("produce") the hydrocarbons from the reservoir, different mechanisms can be utilized such as primary, secondary or tertiary processes. In a primary recovery process, hydrocarbons are displaced from a reservoir through the high natural differential pressure between the reservoir and the bottom-hole pressure within a wellbore. In order to increase the production life of the reservoir, secondary or tertiary recovery processes can be used ("enhanced oil recovery" or EOR). Secondary recovery processes include water or gas well injection, while tertiary methods are based on injecting additional chemical compounds into the well, such as surfactants and polymers, for additional recovery.

For EOR applications, polymers are added as an emulsion or as powders which are then mechanically mixed directly into water. In either emulsion or powder form, the preparation from start to finish takes hours to complete with multiple mixing/holding tanks and/or special equipment. Additionally, the polymer powder cannot be conveniently pumped, and must be safely transported as bulk chemicals.

In the form of polymer emulsions, polymers are suspended as emulsion in a hydrocarbon carrier fluid such as diesel, mineral oil, etc. There are issues with lumping and dispersing the emulsions into water. The emulsions must be mixed in holding tanks for a considerable length of time for hydration to occur. Emulsions leave amounts of carrier oil in the injected solution, which may have an impact on EOR efficiency, particularly in low permeability reservoir. U.S. Pat. No. 8,383,560 discloses a method for dissolving an emulsion to a final polymer concentration of 500 to 3000 ppm for EOR applications in a complex process requiring multi-step mixing under different conditions.

With the use of powders, particularly when the product is used for off-shore platforms (e.g., on a floating production, storage and offloading or FPSO), elaborate powder equipment is required for the handling of very large quantities of powder. Additionally, much time is needed to suspend the polymer powders directly into water, as well as necessary special equipment for the mixing of powders into water. USP2004/008571 discloses an apparatus and method for hydrating particulate polymer, including a pre-wetter, a high-energy mixer, and a blender. USP 2004/0136262 discloses an apparatus and method for wetting powdered material for subsequent distribution of the material in bulk water for EOR applications. USP 2012/0199356 discloses an installation which includes a "polymer slicing unit" for the dissolution of polymer powder for EOR applications.

There is a need for improved polymer compositions/preparations, and methods to prepare/transfer such polymer compositions/preparations for convenient and efficient EOR applications, particularly off-shore EOR.

SUMMARY

In one aspect, the invention relates to a polymer composition for use in enhancing the production of oil from a formation. In one embodiment, the composition includes a powder polymer having an average molecular weight of 0.5 to 30 Million Daltons suspended in a water soluble solvent having an HLB of greater than or equal to 8 and selected from the group of surfactants, glycol ethers, alcohols, co-solvents, and mixtures thereof, at a weight ratio of powder polymer to water soluble solvent ranging from 20:80 to 80:20. The polymer composition is substantially anhydrous. The polymer composition is hydrated in an aqueous fluid for an injection solution in less than or equal to 4 hours containing a polymer concentration ranging from 100 ppm to 50,000 ppm and having a filter ratio of less than or equal to 1.5 at 15 psi using a 1.2 µm filter.

In one aspect, the invention relates to a polymer composition for use in enhancing the production of oil from a formation. In one embodiment, the composition is consisting essentially of a powder polymer having an average molecular weight of 0.5 to 30 Million Daltons selected from the group of polyacrylamides, partially hydrolyzed polyacrylamides, hydrophobically-modified associative polymers, 2-acrylamido 2-methylpropane sulfonic acid and salts thereof, N-vinyl pyrrolidone, biopolymers, synthetic polymers, polyacrylic acid, polyvinyl alcohol, and mixtures thereof; suspended in a water soluble solvent having an HLB of greater than or equal to 8 and selected from the group of surfactants, glycol ethers, alcohols, co-solvents, and mixtures thereof; at a weight ratio of powder polymer to water soluble solvent ranging from 30:70 to 70:30. The polymer composition is substantially anhydrous. The polymer composition is hydrated in an aqueous fluid in less than or equal to 4 hours for an injection solution containing a polymer concentration ranging from 100 ppm to 50,000 ppm and having a filter ratio of less than or equal to 1.5 at 15 psi using a 1.2 µm filter.

DETAILED DESCRIPTION

Figure 1:
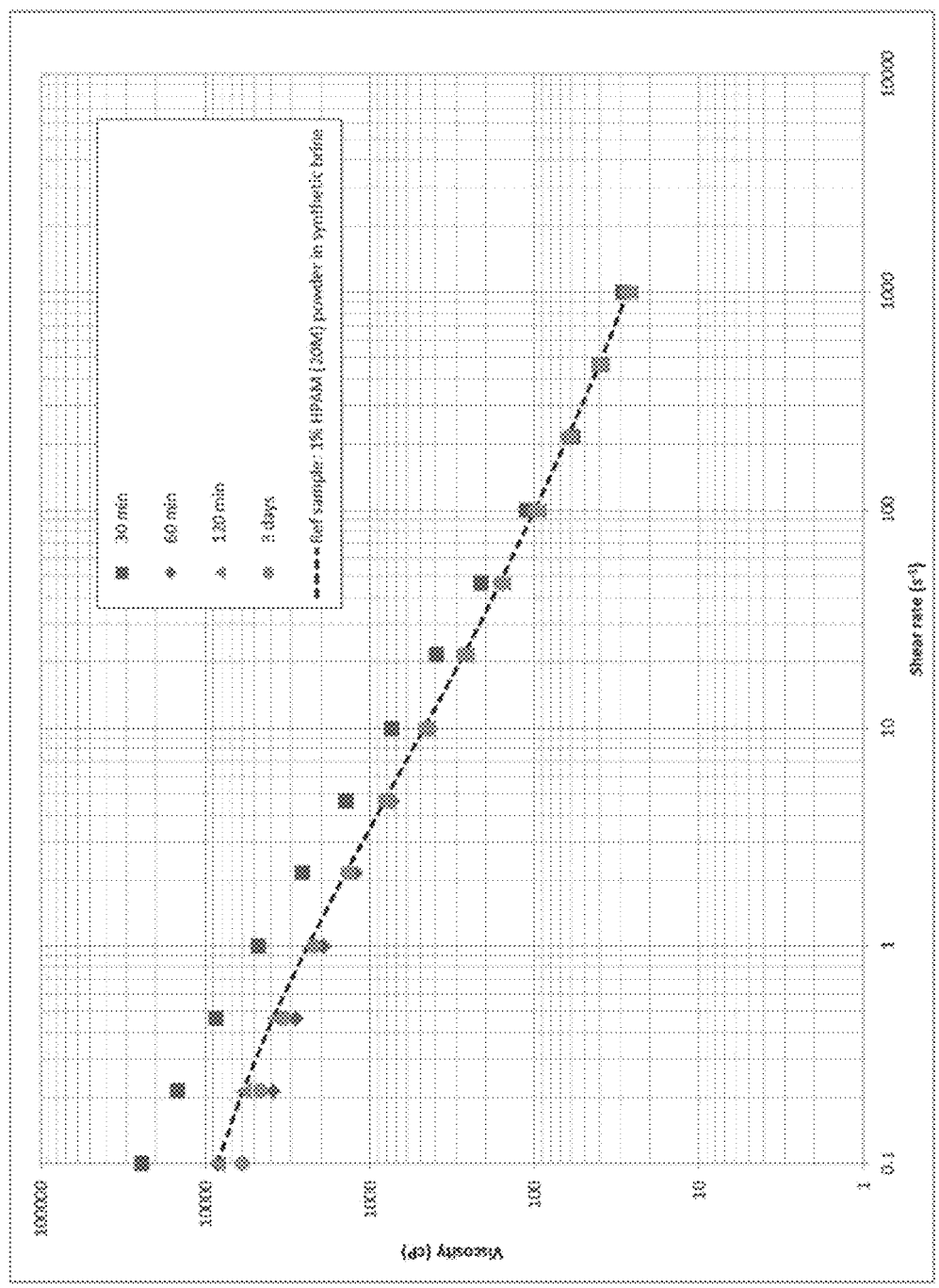
FIG. 1 is an example that compares the viscosities of a polymer solution prepared from the polymer suspension with a prior art polymer solution prepared directly from a powder polymer.

The following terms will be used throughout the specification and will have the following meanings unless otherwise indicated.

"A" or "an" means "at least one" or "one or more" unless otherwise indicated. As used herein "multi-" or "plurality" refers to 2 or more.

"Comprise", "have", "include" and "contain" (and their variants) are open-ended linking verbs and allow the addition of other elements when used in a claim. "Consisting of" is closed, and excludes all additional elements.

"Consisting essentially of" excludes additional material elements, but allows the inclusions of non-material elements that do not substantially change the nature of the invention.

"Effective amount," refers to an amount sufficient to effect a measurable difference over not including the amount. For example, an effective amount of polymer in a polymer slug would increase oil recovery over only using the equivalent slug without polymer.

"Equal" refers to equal values or values within the standard of error of measuring such values. "Substantially equal" refers to an amount that is within 3% of the value recited.

The terms "operation" and "application" may be used interchangeability herein, as in EOR operations or EOR applications.

"Filterability" refers to the mobility control property of an aqueous flooding fluid containing polymer, or the ability to move unimpeded through the formation without blocking the pores of the formation. "Filter ratio" (or filterability ratio) test is a recognized laboratory test to measure the ability of an aqueous flooding fluid to move through a subterranean formation without blocking the pores of the formation, as described in The American Petroleum Institute standards RP 63. Ideally, an aqueous flooding fluid should pass through the filter at a constant rate throughout the test, causing no pore-blocking during filtration, with a filter ratio=1.0. The actual measured filter ratio is typically >1.0, however, so an upper limit to the filter ratio under a specific set of conditions is normally used in order to determine the suitability of an aqueous flooding fluid for use in a mobility control application.

For certain applications, including many enhanced oil recovery (EOR) applications, it can be desirable that a polymer composition flows through a hydrocarbon-bearing formation without plugging the formation. Plugging the formation can slow or inhibit oil production. This is an especially large concern in the case of hydrocarbon-bearing formations that have a relatively low permeability prior to tertiary oil recovery.

One test commonly used to determine performance in such conditions involves measuring the time taken for given volumes/concentrations of solution to flow through a filter, commonly called a filtration quotient or Filter Ratio ("FR"). For example, U.S. Pat. No. 8,383,560, which is incorporated herein by reference, describes a filter ratio test method which measures the time taken by given volumes of a solution containing 1000 ppm of active polymer to flow through a filter. The solution is contained in a cell pressurized to 2 bars and the filter has a diameter of 47 mm and a pore size of 5 microns. The times required to obtain 100 ml (t100 ml), 200 ml (t200 ml), and 300 ml (t300 ml) of filtrate were measured. These values were used to calculate the FR, expressed by the formula below:

$$FR = \frac{t300\ ml - t200\ ml}{t200\ ml - t100\ ml}$$

The FR generally represents the capacity of the polymer solution to plug the filter for two equivalent consecutive volumes. Generally, a lower FR indicates better performance. U.S. Pat. No. 8,383,560 explains that a desirable FR using this method is less than 1.5.

However, polymer compositions that provide desirable results using this test method have not necessarily provided acceptable performance in the field. In particular, many polymers that have an FR (using a 5 micron filter) lower than 1.5 exhibit poor injectivity—i.e., when injected into a formation, they tend to plug the formation, slowing or inhibiting oil production.

A modified filter ratio test method using a smaller pore size (i.e., the same filter ratio test method except that the filter above is replaced with a filter having a diameter of 47 mm, a pore size of 1.2 microns, and a lower pressure of 15 psi provides a better screening method. Injection solutions and polymer compositions hydrated in aqueous fluids for injection solutions consistent with the disclosure herein can provide a FR of less than or equal to 1.5 (i.e., filter ratio of 1.5 or less) at 15 psi using the 1.2 micron filter. In field testing, these injection solutions and polymer compositions hydrated in aqueous fluids for injection solutions consistent with the disclosure herein can exhibit improved injectivity over prior art polymer compositions—including other polymer compositions having an FR (using a 5 micron filter) of less than 1.5. As such, the injection solutions and polymer compositions hydrated in aqueous fluids for injection solutions consistent with the disclosure herein are suitable for use in a variety of oil and gas applications, including EOR.

Filter ratio (FR) can also be determined using the standard procedure described, for example, in Koh, H. *Experimental Investigation of the Effect of Polymers on Residual Oil Saturation*. Ph.D. Dissertation, University of Texas at Austin, 2015; Levitt, D. *The Optimal Use of Enhanced Oil Recovery Polymers Under Hostile Conditions*. Ph.D. Dissertation, University of Texas at Austin, 2009; and Magbagbeola, O. A. Quantification of the Viscoelastic Behavior of High Molecular Weight Polymers used for Chemical Enhanced Oil Recovery. M.S. Thesis, University of Texas at Austin, 2008, each of which is hereby incorporated by reference in its entirety.

For purposes of this disclosure, including the claims, the filter ratio (FR) can be determined using a 1.2 micron filter at 15 psi (plus or minus 10% of 15 psi) at ambient temperature (e.g., 25° C.). The 1.2 micron filter can have a diameter of 47 mm or 90 mm, and the filter ratio can be calculated as the ratio of the time for 180 to 200 ml of the injection solution to filter divided by the time for 60 to 80 ml of the injection solution to filter.

$$FR = \frac{t200\ ml - t180\ ml}{t80\ ml - t60\ ml}$$

For purposes of this disclosure, including the claims, the injection solution is required to exhibit a FR of 1.5 or less.

"HLB" or "hydrophilic-lipophilic balance" refers to the nature of a solvent to have a balance between aqueous and nonaqueous phases, useful for visualizing the ease of mixing the solvent into water. The HLB scale was derived initially for surfactants and provides a means of comparing the relative hydrophilicity of amphiphilic molecules. As used herein, HLB scale refers to surfactants as well as solvents with pseudo-surfactant qualities, such as glycol ethers. A composition with low HLB (<8) has a high affinity for oily or nonaqueous phases and is generally highly insoluble in water. A composition with a high HLB (>8) may generally have a high affinity for water and may form clear mixtures with water, even at high concentrations. Complete water solubility typically occurs at an HLB of about 7.3. Solvents with HLB values above this mark are typically miscible with water, while those below this value are only partially soluble in water.

"Polymer suspension" may be used interchangeably with "slurry," or "polymer slurry," referring to a multi-phase composition of polymer solids (particles) in a liquid phase, with the liquid phase being the continuous phase. The liquid phase is a water soluble solvent. A polymer suspension is not the same as a polymer emulsion, as the emulsion of a polymer emulsion is the result of a chemical process by emulsifying using surfactant and optionally co-surfactants and mechanical homogenization in the presence of oil phase, causing emulsification.

"Pumpable" refers to a state in which the viscosity of the polymer suspension allows the polymer suspension to be pumped through a pump, tubing, equipment to produce hydrocarbons, etc. In one embodiment, the polymer suspension may be pumpable when the viscosity is less than or equal to 15,000 cp measured at 24° C. and 10 inverse seconds.

"Turbidity" refers to the suspension of fine colloidal particles that do not settle out of solution and can result in a "cloudiness." Turbidity is determined by a Nepholometer that measures the relative amount of light able to pass through a solution. Turbidity is reported as NTU (Nepholometric Turbidity Units).

"Pore volume" or "PV" fraction as used herein refers to the total volume of pore space in the oil reservoir that is contemplated in a reservoir sweep (e.g., contacted pore space at alkali-surfactant-polymer (ASP), surfactant-polymer (SP), alkali-polymer (AP), and/or polymer drive (PD) mobility ratio).

"Pore throat" refers to openings in sand/rock formation. Pore throat size in formation forms a continuum from the sub-millimeter to the nanometer scale. For measures of central tendency (mean, mode, median), pore throat sizes (diameters) are generally greater than 2 µm in conventional reservoir rocks, from about 2 to 0.03 µm in tight-gas sandstones, and from 0.1 to 0.005 µm in shales.

"Slug" refers to an amount of a composition that is to be injected into a subterranean reservoir.

"Substantially anhydrous" as used herein refers to a polymer suspension which contains only a trace amount of water. Trace amount means no detectable amount of water in one embodiment; less than or equal to 3 wt. % water in another embodiment; and containing less than or equal to any of 2.5%, 2%, 1%, 0.9%, 0.8%, 0.7%, 0.6%, 0.5%, 0.4%, 0.3%, 0.2%, 0.1%, 0.05% or 0.01% water in various embodiments. A reference to "polymer suspension" refers to a substantially anhydrous polymer suspension.

Disclosed is a preparation of a substantially anhydrous polymer suspension comprising or consisting essentially of powder polymer and a water soluble solvent, which can be conveniently prepared, contained, and transported to well sites for oil and gas operations (e.g., EOR applications or operations). The polymer suspension is stable and can be kept in a holding tank for a considerable period of time. The polymer suspension is water soluble. It can also be transported to a site via pipeline, which is not attainable with the prior art preparations of powder polymer/polymer emulsion. At the EOR site, the polymer suspension can be mixed and diluted with water to the desirable polymer concentration for injection. The polymer suspension obviates the need for special equipment currently required for the handling and mixing of powder polymer and polymer emulsions.

The substantially anhydrous polymer suspension comprises 20-80 wt. % of a powder polymer in a matrix of 80-20 wt. % a water soluble solvent, and optionally other additives. In another embodiment, the substantially anhydrous polymer suspension consists essentially of 30-70 wt. % of a powder polymer in matrix of 70-30 wt. % water soluble solvent, and optional other additives. In another embodiment, the weight ratio of powder polymer to water soluble solvent ranges from 20:80 to 80:20. In yet another embodiment, the weight ratio of powder polymer to water soluble solvent ranges from 30:70 to 70:30. In yet another embodiment, the weight ratio of powder polymer to water soluble solvent ranges from 40:60 to 60:40.

Polymer for Use in Suspension:

The powder polymer for use in the suspension is selected or tailored according to the characteristics of the reservoir for EOR treatment such as permeability, temperature and salinity. Examples of suitable powder polymers include biopolymers such as polysaccharides. For example, polysaccharides can be xanthan gum, scleroglucan, guar gum, any mixtures thereof (e.g., any modifications thereof such as a modified chain), etc. Indeed, the terminology "mixtures thereof" or "combinations thereof" can include "modifications thereof" herein.

Examples of suitable powder synthetic polymers include polyacrylamides. Examples of suitable powder polymers include synthetic polymers such as partially hydrolyzed polyacrylamides (HPAMs or PHPAs) and hydrophobically-modified associative polymers (APs). Also included are co-polymers of polyacrylamide (PAM) and one or both of 2-acrylamido 2-methylpropane sulfonic acid (and/or sodium salt) commonly referred to as AMPS (also more generally known as acrylamido tertiobutyl sulfonic acid or ATBS), N-vinyl pyrrolidone (NVP), and the NVP-based synthetic may be single-, co-, or ter-polymers. In one embodiment, the powder synthetic polymer is polyacrylic acid (PAA). In one embodiment, the powder synthetic polymer is polyvinyl alcohol (PVA). Copolymers may be made of any combination or mixture above, for example, a combination of NVP and ATBS.

Examples of suitable powder polymers include biopolymers or synthetic polymers. Examples of suitable powder polymers can also include any mixture of these powder polymers (including any modifications of these powder polymers).

In one embodiment, the powder polymer is an anionic polyacrylamide having a charge ranging from 0 to about 40%, which may be resultant because the reaction to form polyacrylamide generally starts with about 0% to about 40% acrylic acid or acid salt. The polymer that may be formed with acrylic acid or an acid salt monomer is called anionic polyacrylamide because the polymer itself contains a negative charge, which is balanced by a cation, usually sodium. A polymer made with little or no acid or acid salt is considered nonionic polyacrylamide because the polymer essentially contains no charge.

The powder polymer has an average molecular weights (Mw) of: 0.5 to 30 Million Daltons in one embodiment; from 1 to 15 Million Daltons in a second embodiment; at least 2 Million Daltons in a third embodiment; from 4 to 25 Million Daltons in a fourth embodiment; less than or equal to 25 Million Daltons in a fifth embodiment; and at least 0.5 Million Daltons in a sixth embodiment.

The polymer powders have an average particle size of at least 5 mesh in one embodiment, 10-100 mesh in a second embodiment, and 40-400 mesh in a third embodiment. The polymer powder undergoes an additional milling, grinding, or crushing prior to mixing with the water soluble solvent in the preparation, for a particle size of 1-1000 µm in one embodiment; from 10-500 µm in a second embodiment; at least 5 µm in a third embodiment; and from 20-500 µm in a fourth embodiment.

Water Soluble Solvent.

The water soluble solvent for use in the polymer suspension is selected from one or more of surfactants (e.g., non-ionic surfactants), ethers (e.g., glycol ethers), alcohols, co-solvents, and combinations thereof, for an HLB of greater than or equal to 8 (e.g., at least 8) as measured by methods known in the art, e.g., NMR, gas-liquid chromatography, or invert emulsion experiments using Griffin's method or Davies's method. In one embodiment, the HLB is about 10.0 to about 20. In another embodiment, the HLB is less than or equal to 15. Examples of suitable water soluble solvents can also include any mixture of these water soluble solvents (including any modifications of these water soluble solvents). For example, the water soluble solvent can include a mixture of non-ionic and anionic surfactants. The anionic surfactant can be present in an amount of less than or equal to 5 wt. % as a stabilizer.

In one embodiment, the viscosity of the water soluble solvent is any of 10-1000 cP, such as between about 10-100, 100-200, 200-300, 300-400, 400-500, 500-600, 600-700, 700-800, 900-1000, 10-300, 300-600, or 600-1000 cP as measured by using any of a capillary or oscillatory viscometer, or similar equipment. In one embodiment, the water soluble solvent has a cloud point of less than 90° C., such as between 25 and 80° C., as measured by visual observation of wax forming according to any of ASTM D2500 or a constant cooling rate method (ASTM D5773).

Examples of suitable water soluble solvents include but are not limited to alcohol ethoxylates (-EO-); alcohol alkoxylates (-PO-EO-); alkyl polyglycol ethers; alkyl phenoxy ethoxylates; an ethylene glycol butyl ether (EGBE); a diethylene glycol butyl ether (DGBE); a triethylene glycol butyl ether (TGBE); polyoxyethylene nonylphenylether, branched; and mixtures thereof. In one embodiment, the water soluble solvent is an alcohol selected from the group of isopropyl alcohol (IPA), isobutyl alcohol (IBA) and secondary butyl alcohol (SBA). In another embodiment, the water soluble solvent is a low MW ether such as ethylene glycol monobutyl ether.

In embodiments with the use of HPAM type synthetic polymers, a non-ionic surfactant is used as the water soluble solvent. In yet another embodiment, a mixture of surfactants is used, e.g., non-ionic surfactants and anionic surfactants in a weight ratio ranging from 6:1 to 2:1. Examples of non-ionic surfactants for use as the water soluble solvents include ethoxylated surfactants, nonylphenol ethoxylates or alcohol ethoxylate, other ethoxylated surfactants and mixtures thereof. In another embodiment, the anionic surfactants are selected from the group of internal olefin sulfonates, isomerized olefin sulfonates, alkyl aryl sulfonates, medium alcohol (C10 to C17) alkoxy sulfates, alcohol ether [alkoxy] carboxylates, alcohol ether [alkoxy]sulfates, alkyl sulfonate, α-olefin sulfonates (AOS), dihexyl sulfosuccinate and mixtures thereof. In another embodiment, the water soluble solvent is selected from alkylpolyalkoxy sulfates as disclosed in U.S. Pat. No. 8,853,136, or sulfonated amphoteric surfactants as disclosed in U.S. Pat. No. 8,714,247, or surfactants based on anionic alkyl alkoxylates as disclosed in US Patent Publication No. 20140116689, all incorporated herein by reference.

In one embodiment, the water soluble solvent is selected from isopropyl alcohol (IPA), n-propyl alcohol, isobutyl alcohol (IBA), methyl-isobutyl alcohol, secondary butyl alcohol (SBA), ethylene glycol monobutyl ether, diethylene glycol monobutyl ether, triethylene glycol monobutyl ether, and mixtures thereof. In one embodiment, the water soluble solvent is an ionic surfactant selected from ethoxylated surfactants, nonylphenol ethoxylates, alcohol ethoxylates, internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, alkyl sulfonate, α-olefin sulfonates (AOS), dihexyl sulfosuccinates, alkylpolyalkoxy sulfates, sulfonated amphoteric surfactants, and mixtures thereof. Examples of suitable water soluble solvents can also include any mixture of these water soluble solvents (including any modifications of these water soluble solvents).

In one embodiment, the water soluble solvent is a co-solvent, and the co-solvent is selected from the group of an ionic surfactant, non-ionic surfactant, anionic surfactant, cationic surfactant, nonionic surfactant, amphoteric surfactant, ketones, esters, ethers, glycol ethers, glycol ether esters, lactams, cyclic ureas, alcohols, aromatic hydrocarbons, aliphatic hydrocarbons, alicyclic hydrocarbons, nitroalkanes, unsaturated hydrocarbons, halocarbons, surfactants commonly used for enhanced oil recovery applications, alkyl aryl sulfonates (AAS), a-olefin sulfonates (AOS), internal olefin sulfonates (IOS), alcohol ether sulfates derived from propoxylated $C_2$-$C_{20}$ alcohols, ethoxylated alcohols, mixtures of an alcohol and an ethoxylated alcohol, mixtures of anionic and cationic surfactants, disulfonated surfactants, aromatic ether polysulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, primary amines, secondary amines, tertiary amines, quaternary ammonium cations, cationic surfactants that are linked to a terminal sulfonate or carboxylate group, alkyl aryl alkoxy alcohols, alkyl alkoxy alcohols, alkyl alkoxylated esters, alkyl polyglycosides, alkoxy ethoxyethanol compounds, isobutoxy ethoxyethanol ("iBDGE"), n-pentoxy ethoxyethanol ("n-PDGE"), 2-methylbutoxy ethoxyethanol ("2-MBDGE"), methylbutoxy ethoxyethanol ("3-MBDGE"), (3,3-dimethylbutoxy ethoxyethanol ("3,3-DMBDGE"), cyclohexylmethyleneoxy ethoxyethanol (hereafter "CHMDGE"), 4-Methylpent-2-oxy ethoxyethanol ("MIBCDGE"), n-hexoxy ethoxyethanol (hereafter "n-HDGE"), 4-methylpentoxy ethoxyethanol ("4-MP-DGE"), butoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol and ethoxy ethanol, n-methyl-2-pyrrolidone, dimethyl ethylene urea, and mixtures thereof. Examples of suitable co-solvents can also include any mixture of these co-solvents (including any modifications of these co-solvents)

When the polymer suspension is mixed with produced water in EOR applications, the water soluble solvent (e.g., a surfactant or a mixture thereof) dissolves and can produce a suspension of oil-in-water emulsion if the produced water included oil in the produced water.

Optional Additives:

The polymer suspension can optionally comprise one or more additives. Examples of optional additives include anionic surfactants, biocides, co-solvents, chelators, reducing agents/oxygen scavengers, stabilizers, etc., in an amount of less than or equal to 10 wt. % (of the total weight of the polymer suspension). In one embodiment, a stabilizer is added to further stabilize the suspended polymer. For example, an anionic surfactant can be present in an amount of less than or equal to 5 wt. % as a stabilizer.

Preparation of Polymer Suspension:

Forming the polymer suspension can be done in any suitable manner. The polymer and water soluble solvent can be mixed together to form the polymer suspension, e.g., in a conventional dry powder mixing/blending system. For example, powder polymer is fed to a water soluble solvent in a tank with a feeder/hopper, then mixed together. The mixing is from 20 minutes to 4 hours in one embodiment. In another embodiment, the polymer suspension is mixed and prepared in less than or equal to 30 minutes. In yet another embodiment, the mixing is for at least 15 minutes and less than or equal to 1 hour. In a third embodiment, the mixing is for 24 hours or less.

Properties of the Polymer Suspension:

Unlike the polymer emulsion of the prior art which separates if allowed to stand over a prolonged period of time, the polymer suspension is stable. A "stable suspension" or "stable polymer suspension" as used herein refers to a polymer suspension which does not undergo substantial settling after the polymer has been suspended in the water soluble solvent for a period of at least 2 hours. Furthermore, even settlement happens, the polymer particles can still suspend again by simply agitating the solution to re-generate the polymer suspension. In one embodiment of a stable polymer suspension, the viscosity of the top, middle and bottom of the polymer suspension in a container (e.g., a mixer or holding tank) varies less 15%. The stability of the polymer suspension can be evaluated by visual observation over time, or qualitatively by methods known in the art including light scattering and turbidity methods, for changes in turbidity of more than 25% over a period of at least 2 hours. In one embodiment, after the powder polymer is suspended in the water soluble solvent for a period of at least 2 hours, there can be a turbidity decrease of at least 25%. In one embodiment, after the powder polymer is suspended in the water soluble solvent for a period of at least 2 hours, there can be a turbidity decrease of at least 50%. In one embodiment, after the powder polymer is suspended in the water soluble solvent for a period of at least 2 hours, there can be a turbidity decrease of at least 75%. Moreover, in one embodiment, a stable and substantially anhydrous polymer suspension can be achieved by mixing the powder polymer into the water soluble solvent for less than or equal to 24 hours.

The polymer suspension can be clear, translucent, or slightly hazy depending on the solvent used. However, when the polymer suspension is mixed into an aqueous stream for a injection solution with a sufficient polymer concentration for injection (e.g., less than or equal to 50,000 ppm), the end result is a clear or almost clear injection solution with NTU of less than or equal to 20 in one embodiment; NTU of less than or equal to 15 in a second embodiment; NTU of less than or equal to 10 in a third embodiment; and NTU of less than or equal to 5 in a fourth embodiment. It should be noted that injection solutions prepared from polymer emulsion are milky white, and injection solutions prepared from powder polymer are hazy.

The polymer suspension is pumpable (e.g., with a pump such as a volumetric pump), allowing the polymer suspension to be transported via pipelines long-distance or under sea to off-shore locations. The polymer suspension remains stable and pumpable state even after 24 or 48 hours after forming, and can be hydrated in aqueous fluids for use in injection streams.

Applications of the Polymer Suspension:

The polymer suspension can be stored, pumped, and transported (e.g., via a pipeline, tanker, etc.) to a location for use in EOR applications. The polymer suspension can also be utilized in various mining, hydrocarbon recovery and processing applications, such as in drilling operations (e.g., drilling fluids/dispersants, etc.), and reservoir injection as drilling, fracturing fluids, recovery fluids, water shut-off and conformance control.

As the polymer suspension is concentrated, it can be hydrated in water to a target polymer concentration in an aqueous medium for an injection solution with minimal if any lumps or clumps, without the intense shearing/mixing for extended periods of time (>24 hours) as with the polymer emulsions of the prior art, or with special equipment as with the direct use of powder polymer. The polymer suspension can be hydrated for immediate use in less than or equal to 4 hrs. in one embodiment; in less than or equal to 2 hours in a second embodiment; in less than or equal to 1 hr. in a third embodiment; and less than 30 minutes in a fourth embodiment. The addition to an aqueous medium can be in the form of pouring, as into a container or tank, or by injection, as into a pipeline using a pump and check valve, or by any other means known in the art for dispersing a composition such as the polymer suspension into an aqueous liquid. Depending on the embodiment, the aqueous medium and the polymer suspension can be mixed in an in-line static mixer, dynamic mixer, downhole mixer, or in a mixing tank.

CEOR Applications:

For chemical enhanced oil recovery (CEOR) applications, the polymer suspension is dispersed into an aqueous stream in a sufficient amount for an injection stream with a target hydrated polymer concentration and particle size. The target concentration varies according to the type of polymer employed, as well as the characteristics of the reservoir, e.g., petrophysical rock properties, reservoir fluid properties, reservoir conditions such as temperature, permeability, water compositions, mineralogy and/or reservoir location, etc. The polymer suspension is suitable for use in reservoirs with a permeability about 10 millidarcy to 40 Darcy.

The effective (or target) concentration of the hydrated polymer in the injection stream ranges from 100 to 5000 ppm in one embodiment; less than or equal to 50,000 ppm in a second embodiment; less than or equal to 20,000 ppm in a third embodiment; and less than or equal to 10,000 ppm in a fourth embodiment. The effective concentration of the polymer in the slugs allows a favorable mobility ratio under the reservoir conditions of temperature. Different slugs may comprise different types as well as different amounts of polymer (and polymer suspensions). In embodiments of the disclosure, the polymer suspension is mixed with the injection fluid at ratios which result in the desired effective amount of polymer in the final mixed injection fluid. For example, 1 g of 30% active polymer suspension is added to 99 g of injection water to make 3000 ppm polymer in the final mixed injection fluid. The ratios of polymer suspension to injection fluid is about 1:1000, such as 1:100, 1:200, 1:500, 1:700, and so on. The polymer suspension can be able to be diluted to the target concentration in the injection stream directly or through the multiple dilution steps. For example, 30% active polymer suspension is hydrated to 1% polymer in the injection fluid, then diluted again to make 3000 ppm polymer in the final mixed injection fluid.

The polymer suspension may be passively or actively mixed with the water for a period ranging from 15 minutes to 4 hours in one embodiment, less than or equal to 2 hours in a second embodiment, and from 20 to 60 minutes in a third embodiment. In one embodiment, the polymer suspension is added into a stream of water, for example treated produced water, which then is mixed into the water passively through fluid motion. In another embodiment, the polymer suspension is mixed into the water though a mixer, such as an in-line static mixer or the like. In one embodiment, the polymer suspension and water are mixed in a holding tank through the use of an active mixer, such as a static mixer, in-line mixer, dynamic mixer, downhole mixer, vacuum mixer, high shear mixer, dry powder-liquid blenders, and so on.

The hydrated polymer molecules in the injection stream have a particle size (radius of gyration) ranging from 0.01 to 10 µm in one embodiment. One reservoir characteristic is the median pore throats, which correspond to the permeability of the reservoirs. Depending on the reservoir, the median pore throats in reservoirs may range from 0.01 µm to several hundred micrometers. Since the size of hydrated polymers in water range from 0.01 micrometer to several micrometers depending on the species, molecules, and reservoir conditions, in one embodiment, appropriate polymers are selected for the polymer suspension for the particle size of the hydrated polymer to be less than or equal to 10% of the median pore throat parameters, allowing the hydrated polymer particles to flow through the porous medium in an uninhibited manner. In another embodiment, the hydrated polymer particles have an average particle size ranging from 2 to 8% of the median pore throat size.

Polymer suspension can be hydrated by mixing into a water based injection fluid which can comprise water and optional additives such as chelators, co-solvents, reducing agents/oxygen scavengers, corrosion inhibitors, scale inhibitors, and/or biocides. The water based injection fluid may then be injected into an injection well to recover additional oil.

The water based injection fluid (e.g., injection solution) is characterized as having a filter ratio of less than or equal to 1.5 at 15 psi using a 1.2 µm filter in one embodiment; less than or equal to 1.2 at 15 psi using a 1.2 µm filter in a second embodiment; less than or equal to 1.10 at 15 psi using a 1.2 µm filter in a third embodiment; and less than or equal to 1.05 at 15 psi using a 1.2 µm filter in a fourth embodiment. In some embodiments, the injection solution can have a filter ratio of 1.5 or less (e.g., 1.45 or less, 1.4 or less, 1.35 or less, 1.3 or less, 1.25 or less, 1.2 or less, 1.15 or less, 1.1 or less, or less than 1.05) at 15 psi using a 1.2 µm filter. In some embodiments, the injection solution can have a filter ratio of greater than 1 (e.g., at least 1.05, at least 1.1, at least 1.15, at least 1.2, at least 1.25, at least 1.3, at least 1.35, at least 1.4, or at least 1.45) at 15 psi using a 1.2 µm filter. In some embodiments, the injection solution contains a polymer concentration ranging from 100 ppm to 50,000 ppm and has a filter ratio of less than 1.5 at 15 psi using a 1.2 µm filter (e.g., in less than or equal to 4 hours).

In one embodiment, mixing (e.g., via a mixing tank or an in-line mixer) a sufficient amount of the polymer suspension in the aqueous fluid for the polymer to be hydrated results in the injection solution in less than or equal to 4 hours. In one embodiment, mixing a sufficient amount of the polymer suspension in the aqueous fluid for the polymer to be hydrated results in the injection solution in less than or equal to 2 hours. In one embodiment, mixing a sufficient amount of the polymer suspension in the aqueous fluid for the polymer to be hydrated results in the injection solution in less than or equal to 1 hours. In one embodiment, the injection solution is prepared by mixing the pumpable, stable and substantially anhydrous polymer suspension in an aqueous fluid in less than or equal to 4 hours. In one embodiment, the injection solution is prepared by mixing the pumpable, stable and substantially anhydrous polymer suspension in an aqueous fluid in less than or equal to 2 hours. In one embodiment, the injection solution is prepared by mixing the pumpable, stable and substantially anhydrous polymer suspension in an aqueous fluid in less than or equal to 1 hour. In one embodiment the injection solution has a NTU of less than or equal to 20; a NTU of less than or equal to 15 in a second embodiment; and a NTU of less than or equal to 10 in a third embodiment.

In one embodiment, a method of enhancing oil recovery in a subterranean reservoir includes providing a wellbore in fluid communication with the subterranean reservoir. The method also includes providing a polymer suspension, for example, such that the polymer suspension comprises a powder polymer having an average molecular weight of 0.5 to 30 Million Daltons suspended in a water soluble solvent having an HLB of greater than or equal to 8 and selected from the group of surfactants, glycol ethers, alcohols, co-solvents, and mixtures thereof, at a weight ratio of powder polymer to water soluble solvent ranging from 20:80 to 80:20. For example, the polymer suspension is substantially anhydrous. The method further includes providing an aqueous fluid, for example, selected from any of surface water, water recovered from a production well, sea water, synthetic water, produced reservoir brine, reservoir brine, fresh water, produced water, water, saltwater, and mixtures thereof. The method further includes mixing a sufficient amount of the polymer suspension in the aqueous fluid for the polymer to be hydrated resulting the injection solution, for example, in less than or equal to 4 hours. The injection solution can contain a polymer concentration ranging from 100 ppm to 50,000 ppm and have a filter ratio of less than or equal to 1.5 at 15 psi using a 1.2 µm filter. The method further includes injecting the injection solution into the wellbore into the subterranean reservoir.

In some embodiments, the wellbore is an injection wellbore associated with an injection well, and the method further includes providing a production well spaced apart from the injection well a predetermined distance and having a production wellbore in fluid communication with the subterranean reservoir such that the injection of the injection solution increases flow of hydrocarbons to the production wellbore. In some embodiments, the wellbore is a hydraulic fracturing wellbore associated with a hydraulic fracturing well, for example that may have a substantially vertical portion only or a substantially vertical portion and a substantially horizontal portion below the substantially vertical portion. In some embodiments, the injection solution can function as a drag reducer, a hydraulic fracturing fluid, a flooding fluid, etc. In some embodiments, the injection solution can be included in a hydraulic fracturing fluid (e.g., the injection solution can be one component of the hydraulic fracturing fluid and proppants can be another component of the hydraulic fracturing fluid), included in a flooding fluid, etc. The water for the injection streams (slugs) may be surface water, water recovered from a production well (produced water), sea water, or any synthetic water, for example. The water may comprise salt, monovalent cations, divalent cations, and additional additives. They may be mixed with the injection mixture prior to, during, or after the mixing of the water with the polymer suspension to include any of surfactants, alkali, and optional additives.

Of note, the aqueous fluid used herein for making injection solutions can comprise produced reservoir brine, reservoir brine, sea water, fresh water, produced water, water, saltwater (e.g. water containing one or more salts dissolved therein), brine, synthetic brine, synthetic seawater brine, or any combination thereof. Generally, the aqueous fluid can comprise water from any readily available source, provided that it does not contain an excess of compounds that may adversely affect other components in the injection solution or render the injection solution unsuitable for its intended use (e.g., unsuitable for use in an oil and gas operation such as an EOR application or operation). If desired, aqueous fluids obtained from naturally occurring sources can be treated prior to use. For example, aqueous fluids can be softened (e.g., to reduce the concentration of divalent and trivalent ions in the aqueous fluid) or otherwise treated to adjust their salinity. In certain embodiments, the aqueous fluid can comprise soft brine or hard brine. In certain embodiments, the aqueous fluid can comprise produced reservoir brine, reservoir brine, sea water, or a combination thereof. In some embodiments, the aqueous fluid can be selected from any of surface water, water recovered from a production well, sea water, synthetic water, produced reservoir brine, reservoir brine, fresh water, produced water, water, saltwater (e.g. water containing one or more salts dissolved therein), brine, synthetic brine, synthetic seawater brine, and mixtures thereof. In one embodiment, the brine may be a synthetic seawater brine as illustrated in Table A.

TABLE A

| Ions (ppm) | Synthetic seawater brine |
|---|---|
| Na+ | 10800 |
| K+ | 400 |
| Ca++ | 410 |
| Mg++ | 1280 |
| Cl- | 19400 |
| TDS | 32290 |

In one embodiment, seawater is used as the aqueous base, since off-shore production facilities tend to have an abundance of seawater available, limited storage space, and transportation costs to and from off-shore site are typically high. If seawater is used as the aqueous base, it can be softened prior to the addition of the suspended polymer, thereby removing any multivalent ions, specifically Mg and Ca.

Surfactants.

In one embodiment, surfactants are used as the water soluble solvent for the polymer suspension, and no additional surfactant is added. In certain other embodiments, the injection streams comprise a polymer suspension and one or more additional surfactants to lower the interfacial tension between the oil and water phase in the reservoir to less than about $10^{-2}$ dyne/cm (for example), thereby recovering additional oil by mobilizing and solubilizing oil trapped by capillary forces.

Examples of surfactants for addition to the polymer suspension include, but are not limited to, anionic surfactants, cationic surfactants, amphoteric surfactants, non-ionic surfactants, or a combination thereof. Anionic surfactants can include sulfates, sulfonates, phosphates, or carboxylates. Such anionic surfactants are known and described in the art in, for example, U.S. Pat. No. 7,770,641, incorporated herein by reference in its entirety and for all purposes. Examples of specific anionic surfactants include internal olefin sulfonates, isomerized olefin sulfonates, alkyl aryl sulfonates, medium alcohol (C10 to C17) alkoxy sulfates, alcohol ether [alkoxy] single sulfonates, alcohol ether [alkoxy]sulfates, and alcohol ether [alkoxy]carboxylates. Example cationic surfactants include primary, secondary, or tertiary amines, or quaternary ammonium cations. Example amphoteric surfactants include cationic surfactants that are linked to a terminal sulfonate or sulfonate group. Example non-ionic surfactants include other alcohol alkoxylates such as alkylaryl alkoxy alcohols or alkyl alkoxy alcohols. Other non-ionic surfactants can include alkyl alkoxylated esters and alkyl polyglycosides. In some embodiments, multiple non-ionic surfactants such as non-ionic alcohols or non-ionic esters are combined. As a skilled artisan may appreciate, the surfactant(s) selection may vary depending upon such factors as salinity, temperature, and clay content in the reservoir. The surfactants can be injected in any manner such as continuously or in a batch process.

Alkali.

Depending on the type of reservoir, alkali may be included in the polymer flood, making it an alkali-polymer (AP) flood or an alkali-surfactant-polymer (ASP) flood. In one embodiment, the alkali employed is a basic salt of an alkali metal from Group IA metals of the Periodic Table. In another embodiment, the composition comprises the polymer suspension, a multicarboxylate and one or more alkali metals. Certain embodiments of the disclosure are a method of using a composition comprising a multicarboxylate and one or more alkali metals in an enhanced oil recovery process. In an embodiment, the alkali metal salt is a base, such as an alkali metal hydroxide, carbonate or bicarbonate, including, but not limited to, sodium carbonate, sodium bicarbonate, sodium hydroxide, potassium hydroxide, sodium silicate, tetrasodium EDTA, sodium metaborate, sodium citrate, and sodium tetraborate. The alkali may be used in amounts ranging from about 0.3 to about 5.0 weight percent of the injection fluid, such as about 0.5 to about 3 weight percent. Use of the alkali maintains surfactant in a high pH environment, which can minimize surfactant adsorption. Alkali can also protect the surfactant from hardness. Using alkali before and after an ASP slug can help to minimize surfactant adsorption, as a high pH environment is maintained through any diffusion of an ASP slug.

Additional Additives.

The injection slugs (or injection fluid) in one embodiment comprise additional additives. Examples include chelators, co-solvents, reducing agents/oxygen scavengers, and biocides. Chelators may be used to complex with multivalent cations and soften the water in the injection fluid. Examples of chelators include ethylenediaminetetraacetic acid (EDTA) which can also be used as an alkali, methylglycinediacetic acid (MGDA). Chelants may be utilized to handle hard brines. The amount of chelant may be selected based on the amount of divalent ions in the slugs. For example, chelating agents can be used a 10:1 molar ratio with divalent cations such as calcium or magnesium.

Co-solvents may also be included in the injection fluid containing the polymer suspension. Suitable co-solvents are alcohols, such as lower carbon chain alcohols like isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; alcohol ethers, polyalkylene alcohol ethers, polyalkylene glycols, poly(oxyalkylene)glycols, poly(oxyalkylene)glycols ethers or any other common organic co-solvent or combinations of any two or more co-solvents. For example, in an embodiment, an ether, ethylene glycol butyl ether (EGBE), is used and may be about 0.75 to 1.5 times the concentration of surfactant of ASP slug 21. Co-solvents, when used, may be present in an amount of about 0.5 to about 6.0 weight percent of the injection fluid, such as from about 0.5 to about 4.0 weight percent, or about 0.5 to about 3 weight percent.

Reducing agents/oxygen scavengers such as sodium dithionite may be used to remove any oxygen in the mixture and reduce any free iron into Fe2+. They can be used to protect synthetic polymers from reactions that cleave the polymer molecule and lower or remove viscosifying abilities. A reduced environment can also lower surfactant adsorption.

Biocides can be used to prevent organic (algal) growth in facilities, stop sulfate reducing bacteria (SRB) growth which "sour" the reservoir by producing H2S, and are also used to protect biopolymers from biological life which feed on their sugar-like structures and therefore remove mobility control. Biocides include aldehydes and quaternary ammonium compounds.

The polymer suspension is added to a sufficient amount for the slug to efficiently sweep the reservoir. The required viscosity is a function of mobility ratio. Mobility ratio (M) is defined as water (or ASP) relative permeability divided by oil relative permeability multiplied by oil viscosity divided by water (or ASP) viscosity (krw/kro*μo/μw). Generally a unit mobility ratio, M=1, or lower is desired in an ASP flood. In one example, effective amounts of polymer are equal to or less than that of each subsequent slug's viscosity in order obtain favorable mobility ratio throughout the entire flood process.

For each reservoir operation, the optimal slug volumes may be determined prior to injection. For example, the polymer slugs may be injected into the reservoir in volumes of between 0.05 to 1.0 PV, 0.1 to 0.4 PV, or ~0.1 PV. The necessary slug size can be determined through core flooding experiments and simulation. The volume of a SP slug may be the equal to, or different from the volume of the chaser. The speed of injection of the slugs may also vary depending on the reservoir operations.

EXAMPLES

The following examples are given to illustrate the present invention. In the examples, the polymer suspension shows a comparable or even better hydration, filterability and viscosity yield with conventional polymer compositions prepared from either hydrated powder polymer or commercial oil/water emulsion polymers. However, that the invention is not limited to the specific conditions or details described in these examples.

Example 1

Samples of a commercially available 20M HPAM polymer in various particle size distribution from fine, normal, to coarse polymer powders were prepared using a burr grinder. The samples (fine, normal, and coarse) have normalized weight % distribution for various mesh sizes are shown in Table 1.

TABLE 1

| Mess size | 16 | 20 | 25 | 40 | 70 | 140 | 200 | 325 | 400 | Pan |
|---|---|---|---|---|---|---|---|---|---|---|
| Fine | — | — | — | 9.53 | 36.06 | 21.52 | 10.13 | 13.38 | 2.54 | 6.84 |
| Normal | 0.01 | 0.37 | 3.00 | 49.15 | 38.37 | 7.00 | 1.18 | 0.35 | 0.14 | 0.42 |
| Coarse | — | 9.83 | 20.03 | 43.34 | 24.23 | 1.85 | 0.48 | 0.58 | — | — |

A number of water-soluble non-ionic surfactants having properties as shown in Table 2 were used as solvent for the polymer samples:

TABLE 2

| Structure | HLB* | Specific Gravity | Viscosity (cP) | Cloud Point (° C.) |
|---|---|---|---|---|
| Lauryl Alcohol-6.5EO | 8 | 0.95 | | 53 |
| Alcohol Ethoxylate | — | 1.02 | 120 @ 25 C. | 47 |
| TDA-9EO | 13 | 0.977 | 145 @ 25 C. | 58 |
| Alcohol Ethoxylate A | 12 | 1.01 | 100 @ 25 C. | 64 |
| Alcohol Ethoxylate B | 14 | 1 | 120 @ 25 C. | 73 |
| Alcohol Ethoxylate C | 14 | 1-1.05 | 80 @ 25 C. | 62 |
| C10 Guerbet-7EO | 12.5 | 0.99 | 70 @ 25 C. | 68 |
| TDA-5EO | 10.5 | 0.97 | 24 @ 40 C. | 64 |
| TDA-7EO | 12 | 1.0 | 7.1 @ 40 C. | N/A |
| TDA-9EO | 13 | 1.01 | 41 @ 40 C. | 59 |
| TDA-12EO | 14.4 | 1.03 | 51 @ 40 C. | 85 |

Polymer suspension samples were prepared from the non-ionic surfactant in ratios of polymer to solvent of 40:60 to 60:40. The polymer suspension made of fine powder had better stability than those made of coarse powder. However, a polymer suspension could be stabilized by the addition of small amount of an anionic surfactant, e.g., less than 10 wt. %.

Example 2

A polymer suspension was prepared from a 50:50 mixture of a partially (25-30%) hydrolyzed polyacrylamide powder, and a water soluble solvent prepared from a mixture of non-ionic surfactants with HLB of >8. The non-ionic surfactant mixture contain ethoxylates of alkyl polyethylene glycol ethers based on the C10-Guerbet alcohol and linear alcohol alkoxylates. The mixture was stirred for about 24 hours. A small amount (<5 wt. %) of an anionic surfactant, sodium dihexyl sulfosuccinate, was added to the mixture as a stabilizer. The polymer suspension remained stable after 24 and 48 hours.

Example 3

Another polymer suspension was prepared from a 50:50 mixture of 20 M HPAM polymer powder and a water soluble solvent prepared from a mixture of alkoxylated (ethoxylated propoxylated) non-ionic surfactants with HLB of >8. A small amount (<5 wt. %) of sodium dihexyl sulfosuccinate anionic surfactant was added to the mixture as a stabilizer. The mixture was stirred for 10 minutes for a moderately viscous suspension.

Example 4

A synthetic brine solution was used as base brine. The synthetic brine solution included the following: $Na^+$, $Ca^{2+}$, $Mg^{2+}$, $Cl^-$, and TDS of about 15,000 ppm.

Example 5

In the comparative examples, two samples of 1% polymer in solution were prepared from the synthetic brine solution of Example 4 with 100% active powder polymer and 30% polymer emulsion. Both samples were prepared using methods known in the art, i.e., intense mixing with special equipment along the line of polymer slicing unit for the powder polymer, and extensive mixing for at least 48 hours for the polymer emulsion. The 1% polymer in solution prepared from powder polymer was hazy in appearance. The 1% polymer prepared from emulsion polymer was milky white.

Example 6

The polymer suspension from Example 3 was mixed with the synthetic brine solution of Example 4 for a concentration of 1% polymer in solution. The polymer suspensions were hydrated as quickly as 30 minutes under strong shear stress. The sample (in a beaker) was observed to be crystal clear.

Example 7

The polymer suspension from Example 3 was mixed with the synthetic brine solution of Example 4 for a concentration of 1% polymer in solution. Samples were prepared with mixing ranging from 30 minutes to 3 days. FIG. 1 shows that 60 minutes hydration (mixing in lab scale) was sufficient enough to get a comparable viscosity with 1% polymer hydrated from powder polymer (comparative Example 5).

Example 8

Figure 2:
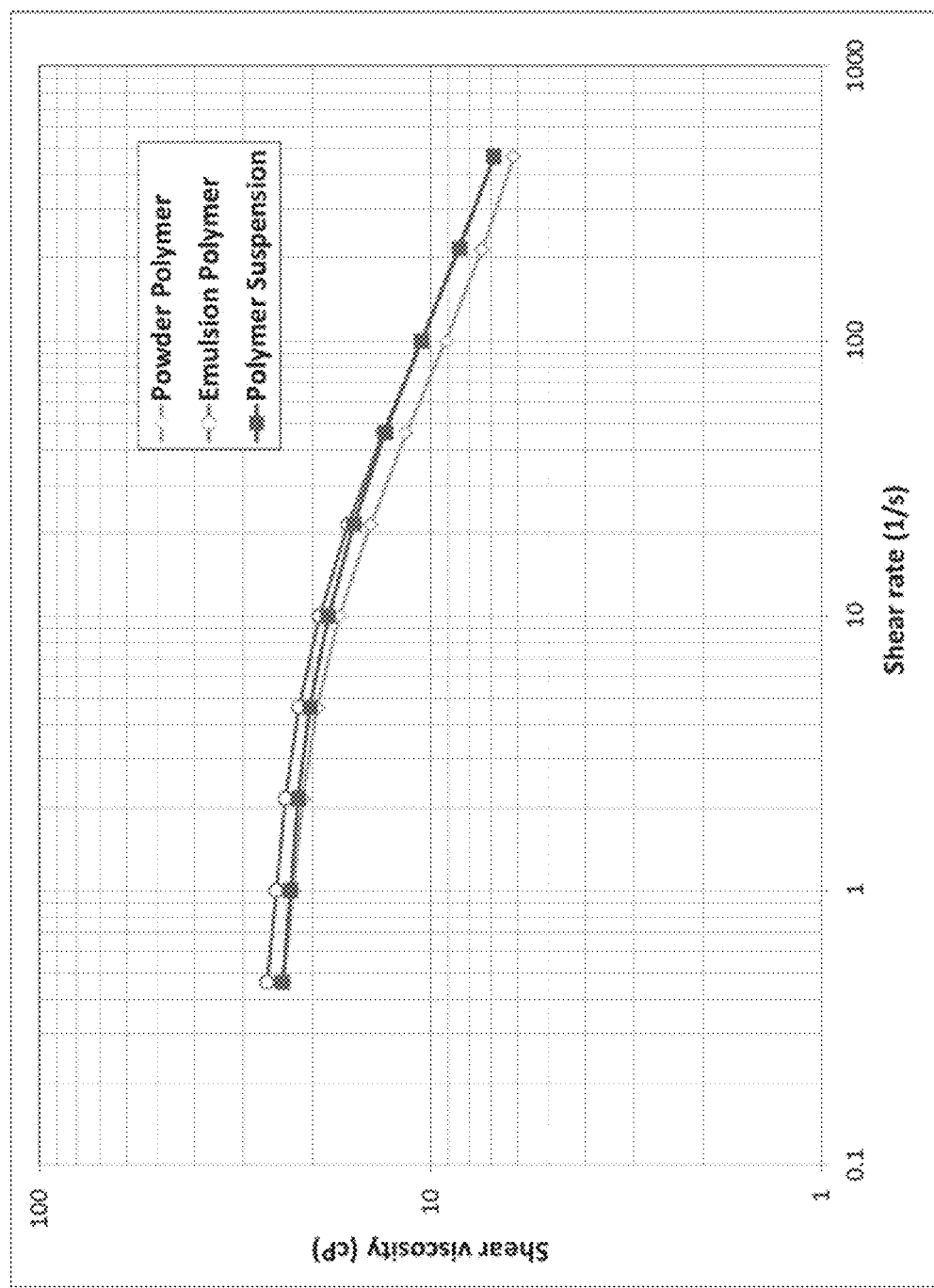
FIG. 2 is an example that compares the rheology of a polymer solution prepared from the polymer suspension with a prior art polymer solution prepared directly from a powder polymer, and a prior art polymer solution prepared from a polymer emulsion.

A sample of 2000 ppm polymer in solution was prepared from the 50% polymer suspension of Example 3 in the synthetic brine solution of Example 4. Comparable polymer solution samples were prepared from the powder polymer and polymer emulsion samples using methods known in the art. FIG. 2 shows that the polymer suspension shows a comparable viscosity yield with conventional emulsion polymers or commercial powder polymers.

Example 9

Figure 3:
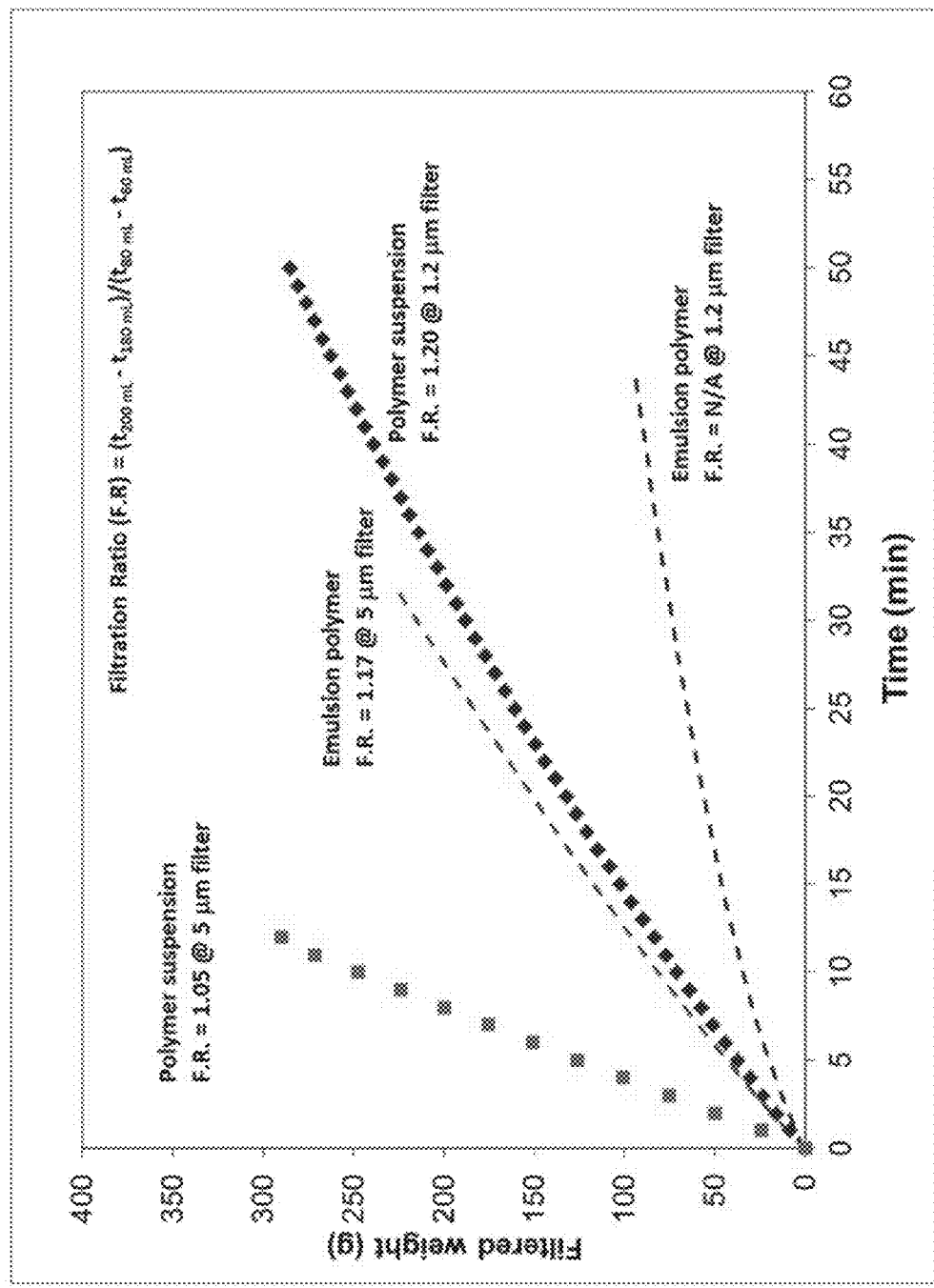
FIG. 3 is an example that compares the filterability of a polymer solution prepared from the polymer suspension with a polymer solution prepared from a polymer emulsion of the prior art.

A sample of 2000 ppm HPAM polymer hydrated in a synthetic brine of Example 4 was prepared from the polymer suspension of Example 3. Comparable polymer samples were prepared from samples of 1% polymer hydrated from powder polymer, and 1% polymer solution prepared from emulsion polymer. Filtration tests using 5 µm and 1.2 µm membrane at 25° C. and 15 psi were carried out. FIG. 3 shows that the polymer suspension shows a comparable if not better filterability even after a short hydration.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference. It is to be expressly understood, however, that each of the figures is provided for the purpose of illustration and description only and is not intended as a definition of the limits of the present invention.

For the avoidance of doubt, the present application includes the subject-matter defined in the following numbered paragraphs:

Claim Set A

Claim 1A: A polymer composition for use in enhancing the production of oil from a formation, the composition comprising:

a powder polymer having an average molecular weight of 0.5 to 30 Million Daltons suspended in a water soluble solvent having an HLB of greater than or equal to 8 and selected from the group of surfactants, glycol ethers, alcohols, co-solvents, and mixtures thereof, at a weight ratio of powder polymer to water soluble solvent ranging from 20:80 to 80:20; and wherein the polymer composition is substantially anhydrous;

wherein the polymer composition is hydrated in an aqueous fluid for an injection solution in less than or equal to 4 hours containing a polymer concentration ranging from 100 ppm to 50,000 ppm and having a filter ratio of less than or equal to 1.5 at 15 psi using a 1.2 µm filter.

Claim 2A. The polymer composition of claim 1A, wherein the polymer composition is hydrated in an aqueous fluid for an injection solution in less than or equal to 2 hours.

Claim 3A. The polymer composition of claim 2A, wherein the polymer composition is hydrated in an aqueous fluid for an injection solution in less than or equal to 1 hour.

Claim 4A. The polymer composition of claim 1A, wherein the polymer composition is hydrated in an aqueous fluid for an injection solution in less than or equal to 2 hours and having a filter ratio of less than or equal to 1.2 at 15 psi using a 1.2 µm filter.

Claim 5A. The polymer composition of claim 4A, wherein the polymer composition is hydrated in an aqueous fluid for an injection solution in less than or equal to ½ hours and having a filter ratio of less than or equal to 1.05 at 15 psi using a 1.2 μm filter.

Claim 6A. The polymer composition of claim 1A, wherein the polymer composition is hydrated in an aqueous fluid for an injection solution in less than or equal to 4 hours, and having a NTU of less than or equal to 20.

Claim 7A. The polymer composition of claim 6A, wherein the polymer composition is hydrated in an aqueous fluid in less than or equal to 1 hour for an injection solution having a NTU of less than or equal to 15.

Claim 8A. The polymer composition of claim 7A, wherein the polymer composition is hydrated in an aqueous fluid in less than or equal to 1 hour for an injection solution having a NTU of less than or equal to 10.

Claim 9A. The polymer composition of claim 1A, wherein the polymer composition is stable.

Claim 10A. The polymer composition of claim 1A, where the polymer composition is characterized has having a turbidity decrease of at least 25% after the powder polymer is suspended in the water soluble solvent for a period of at least 2 hours.

Claim 11A. The polymer composition of claim 10A, where the polymer composition is characterized has having a turbidity decrease of at least 50% after the powder polymer is suspended in the water soluble solvent for a period of at least 2 hours.

Claim 12A. The polymer composition of claim 11A, where the polymer composition is characterized has having a turbidity decrease of at least 75% after the powder polymer is suspended in the water soluble solvent for a period of at least 2 hours.

Claim 13A. The polymer composition of claim 1A, wherein the polymer composition is hydrated in an aqueous fluid by mixing a sufficient concentration of the polymer suspension in an aqueous fluid in a mixing tank or an in-line mixer in less than or equal to 4 hours for an injection solution containing a polymer concentration ranging from 100 ppm to 50,000 ppm.

Claim 14A. The polymer composition of claim 13A, wherein the polymer composition is hydrated in an aqueous fluid by mixing a sufficient concentration of the polymer suspension in an aqueous fluid in a mixing tank or an in-line mixer in less than or equal to 2 hours for an injection solution containing a polymer concentration ranging from 100 ppm to 50,000 ppm.

Claim 15A. The polymer composition of claim 14A, wherein the polymer composition is hydrated in an aqueous fluid by mixing a sufficient concentration of the polymer suspension in an aqueous fluid in a mixing tank or an in-line mixer in less than or equal to 1 hour for an injection solution containing a polymer concentration ranging from 100 ppm to 50,000 ppm.

Claim 16A. The polymer composition of claim 1A, wherein the polymer composition is pumpable.

Claim 17A. The polymer composition of claim 16A, wherein the polymer composition remains pumpable after the powder polymer is suspended in the water soluble solvent for more than or equal to 24 hours.

Claim 18A. The polymer composition of claim 1A, wherein the powder polymer is a biopolymer that is a polysaccharide.

Claim 19A. The polymer composition of claim 1A, wherein the powder polymer is a biopolymer or a synthetic polymer.

Claim 20A. The polymer composition of claim 1A, wherein the powder polymer is a synthetic polymer selected from the group of polyacrylamides, partially hydrolyzed polyacrylamides, hydrophobically-modified associative polymers, 2-acrylamido 2-methylpropane sulfonic acid and salts thereof, N-vinyl pyrrolidone, polyacrylic acid, polyvinyl alcohol, and mixtures thereof.

Claim 21A. The polymer composition of claim 1A, wherein the powder polymer is suspended in a water soluble solvent having an HLB of greater than or equal to 8 that comprises a mixture of non-ionic and anionic surfactants.

Claim 22A. The polymer composition of claim 21A, wherein the anionic surfactant is present in an amount of less than or equal to 5 wt. % as a stabilizer.

Claim 23A. The polymer composition of claim 1A, wherein the water soluble solvent is selected from isopropyl alcohol (IPA), n-propyl alcohol, isobutyl alcohol (IBA), methyl-isobutyl alcohol, secondary butyl alcohol (SBA), ethylene glycol monobutyl ether, diethylene glycol monobutyl ether, triethylene glycol monobutyl ether, and mixtures thereof.

Claim 24A. The polymer composition of claim 1A, wherein the water soluble solvent is an ionic surfactant selected from ethoxylated surfactants, nonylphenol ethoxylates, alcohol ethoxylates, internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, alkyl sulfonate, α-olefin sulfonates (AOS), dihexyl sulfosuccinates, alkylpolyalkoxy sulfates, sulfonated amphoteric surfactants, and mixtures thereof.

Claim 25A. The polymer composition of claim 1A, wherein the water soluble solvent is a co-solvent, wherein the co-solvent is selected from the group of an ionic surfactant, non-ionic surfactant, anionic surfactant, cationic surfactant, nonionic surfactant, amphoteric surfactant, ketones, esters, ethers, glycol ethers, glycol ether esters, lactams, cyclic ureas, alcohols, aromatic hydrocarbons, aliphatic hydrocarbons, alicyclic hydrocarbons, nitroalkanes, unsaturated hydrocarbons, halocarbons, surfactants commonly used for enhanced oil recovery applications, alkyl aryl sulfonates (AAS), a-olefin sulfonates (AOS), internal olefin sulfonates (IOS), alcohol ether sulfates derived from propoxylated $C_2$-$C_{20}$ alcohols, ethoxylated alcohols, mixtures of an alcohol and an ethoxylated alcohol, mixtures of anionic and cationic surfactants, disulfonated surfactants, aromatic ether polysulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, primary amines, secondary amines, tertiary amines, quaternary ammonium cations, cationic surfactants that are linked to a terminal sulfonate or carboxylate group, alkyl aryl alkoxy alcohols, alkyl alkoxy alcohols, alkyl alkoxylated esters, alkyl polyglycosides, alkoxy ethoxyethanol compounds, isobutoxy ethoxyethanol ("iBDGE"), n-pentoxy ethoxyethanol ("n-PDGE"), 2-methylbutoxy ethoxyethanol ("2-MBDGE"), methylbutoxy ethoxyethanol ("3-MBDGE"), (3,3-dimethylbutoxy ethoxyethanol ("3,3-DMBDGE"), cyclohexylmethyleneoxy ethoxyethanol (hereafter "CHMDGE"), 4-Methylpent-2-oxy ethoxyethanol ("MIBCDGE"), n-hexoxy ethoxyethanol (hereafter "n-HDGE"), 4-methylpentoxy ethoxyethanol ("4-MPDGE"), butoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol and ethoxy ethanol, n-methyl-2-pyrrolidone, dimethyl ethylene urea, and mixtures thereof.

Claim 26A. A polymer composition for use in enhancing the production of oil from a formation, the composition consisting essentially of a powder polymer having an average molecular weight of 0.5 to 30 Million Daltons selected from the group of polyacrylamides, partially hydrolyzed polyacrylamides, hydrophobically-modified associative polymers, 2-acrylamido 2-methylpropane sulfonic acid and salts thereof, N-vinyl pyrrolidone, biopolymers, synthetic polymers, polyacrylic acid, polyvinyl alcohol, and mixtures thereof; suspended in a water soluble solvent having an HLB of greater than or equal to 8 and selected from the group of surfactants, glycol ethers, alcohols, co-solvents, and mixtures thereof; at a weight ratio of powder polymer to water soluble solvent ranging from 30:70 to 70:30;

wherein the polymer composition is substantially anhydrous; and wherein the polymer composition is hydrated in an aqueous fluid in less than or equal to 4 hours for an injection solution containing a polymer concentration ranging from 100 ppm to 50,000 ppm and having a filter ratio of less than or equal to 1.5 at 15 psi using a 1.2 μm filter.

Claim Set B

Claim 1B. A method of enhancing oil recovery in a subterranean reservoir, the method comprising providing a wellbore in fluid communication with the subterranean reservoir;

providing a polymer suspension, wherein the polymer suspension comprises a powder polymer having an average molecular weight of 0.5 to 30 Million Daltons suspended in a water soluble solvent having an HLB of greater than or equal to 8 and selected from the group of surfactants, glycol ethers, alcohols, co-solvents, and mixtures thereof, at a weight ratio of powder polymer to water soluble solvent ranging from 20:80 to 80:20; wherein the polymer suspension is substantially anhydrous;

providing an aqueous fluid selected from any of surface water, water recovered from a production well, sea water, synthetic water, produced reservoir brine, reservoir brine, fresh water, produced water, water, saltwater, brine, synthetic brine, synthetic seawater brine, and mixtures thereof;

mixing a sufficient amount of the polymer suspension in the aqueous fluid for the polymer to be hydrated resulting an injection solution in less than or equal to 4 hours, the injection solution containing a polymer concentration ranging from 100 ppm to 50,000 ppm and having a filter ratio of less than 1.5 at 15 psi using a 1.2 μm filter;

injecting the injection solution into the wellbore into the subterranean reservoir.

Claim 2B. The method of claim 1B, wherein the mixing of a sufficient amount of the polymer suspension in the aqueous fluid is via a mixing tank or an in-line mixer.

Claim 3B. The method of claim 1B, wherein the mixing of a sufficient amount of the polymer suspension in the aqueous fluid for the polymer to be hydrated resulting in an injection solution in less than or equal to 2 hours.

Claim 4B. The method of claim 3B, wherein the mixing of a sufficient amount of the polymer suspension in the aqueous fluid for the polymer to be hydrated resulting in an injection solution in less than or equal to 1 hour.

Claim 5B. The method of claim 1B, wherein the mixing of a sufficient amount of the polymer suspension in the aqueous fluid resulting in an injection solution having a filter ratio of less than or equal to 1.2 at 15 psi using a 1.2 μm filter.

Claim 6B. The method of claim 5B, wherein the mixing of a sufficient amount of the polymer suspension in the aqueous fluid resulting in an injection solution having a filter ratio of less than or equal to 1.05 at 15 psi using a 1.2 μm filter.

Claim 7B. The method of claim 1B, wherein the mixing of a sufficient amount of the polymer suspension in the aqueous fluid resulting in an injection solution having a NTU of less than or equal to 20.

Claim 8B. The method of claim 7B, wherein the mixing of a sufficient amount of the polymer suspension in the aqueous fluid resulting in an injection solution having a NTU of less than or equal to 15.

Claim 9B. The method of claim 8B, wherein the mixing of a sufficient amount of the polymer suspension in the aqueous fluid resulting in an injection solution having a NTU of less than or equal to 10.

Claim 10B. The method of claim 1B, wherein after the powder polymer is suspended in the water soluble solvent for a period of at least 2 hours with a turbidity decrease of at least 25%.

Claim 11B. The method of claim 10B, wherein after the powder polymer is suspended in the water soluble solvent for a period of at least 2 hours with a turbidity decrease of at least 50%.

Claim 12B. The method of claim 11B, wherein after the powder polymer is suspended in the water soluble solvent for a period of at least 2 hours with a turbidity decrease of at least 75%.

Claim 13B. The method of claim 1B, wherein the mixing of a sufficient amount of the polymer suspension in the aqueous fluid is for less than or equal to 2 hours for an injection solution.

Claim 14B. The method of claim 13B, wherein the mixing of a sufficient amount of the polymer suspension in the aqueous fluid is for less than or equal to 1 hour for an injection solution.

Claim 15B. The method of claim 1B, wherein providing the polymer suspension comprises mixing the powder polymer into the water soluble solvent for less than or equal to 24 hours, for a stable and substantially anhydrous polymer suspension.

Claim 16B. The method of claim 1B, wherein providing the polymer suspension comprises mixing the powder polymer into the water soluble solvent and wherein the powder polymer is a biopolymer that is a polysaccharide.

Claim 17B. The method of claim 1B, wherein providing the polymer suspension comprises mixing the powder polymer into the water soluble solvent and wherein the powder polymer is a biopolymer or a synthetic polymer.

Claim 18B. The method of claim 1B, wherein providing the polymer suspension comprises mixing the powder polymer into the water soluble solvent and wherein the powder polymer is a synthetic polymer selected from the group of polyacrylamides, partially hydrolyzed polyacrylamides, hydrophobically-modified associative polymers, 2-acrylamido 2-methylpropane sulfonic acid and salts thereof, N-vinyl pyrrolidone, polyacrylic acid, polyvinyl alcohol, and mixtures thereof.

Claim 19B. The method of claim 1B, wherein providing the polymer suspension comprises mixing the powder polymer into the water soluble solvent and wherein the water soluble solvent comprises a mixture of non-ionic and anionic surfactants.

Claim 20B. The method of claim 19B, wherein the anionic surfactant is present in an amount of less than or equal to 5 wt. % as a stabilizer.

Claim 21B. The method of claim 1B, wherein providing the polymer suspension comprises mixing the powder polymer into the water soluble solvent and wherein the water soluble solvent is selected from isopropyl alcohol (IPA), n-propyl alcohol, isobutyl alcohol (IBA), methyl-isobutyl alcohol, secondary butyl alcohol (SBA), ethylene glycol monobutyl ether, diethylene glycol monobutyl ether, triethylene glycol monobutyl ether, and mixtures thereof.

Claim 22B. The method of claim 1B, wherein providing the polymer suspension comprises mixing the powder polymer into the water soluble solvent and wherein the water soluble solvent is selected from ethoxylated surfactants, nonylphenol ethoxylates, alcohol ethoxylates, internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy] sulfates, alkyl sulfonate, α-olefin sulfonates (AOS), dihexyl sulfosuccinates, alkylpolyalkoxy sulfates, sulfonated amphoteric surfactants, and mixtures thereof.

Claim 23B. The method of claim 1B, wherein providing the polymer suspension comprises mixing the powder polymer into the water soluble solvent and wherein the water soluble solvent is a co-solvent selected from the group of an ionic surfactant, non-ionic surfactant, anionic surfactant, cationic surfactant, nonionic surfactant, amphoteric surfactant, ketones, esters, ethers, glycol ethers, glycol ether esters, lactams, cyclic ureas, alcohols, aromatic hydrocarbons, aliphatic hydrocarbons, alicyclic hydrocarbons, nitroalkanes, unsaturated hydrocarbons, halocarbons, surfactants commonly used for enhanced oil recovery applications, alkyl aryl sulfonates (AAS), a-olefin sulfonates (AOS), internal olefin sulfonates (IOS), alcohol ether sulfates derived from propoxylated $C_{i2}$-$C_2$o alcohols, ethoxylated alcohols, mixtures of an alcohol and an ethoxylated alcohol, mixtures of anionic and cationic surfactants, disulfonated surfactants, aromatic ether polysulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, primary amines, secondary amines, tertiary amines, quaternary ammonium cations, cationic surfactants that are linked to a terminal sulfonate or carboxylate group, alkyl aryl alkoxy alcohols, alkyl alkoxy alcohols, alkyl alkoxylated esters, alkyl polyglycosides, alkoxy ethoxyethanol compounds, isobutoxy ethoxyethanol ("iBDGE"), n-pentoxy ethoxyethanol ("n-PDGE"), 2-methylbutoxy ethoxyethanol ("2-MBDGE"), methylbutoxy ethoxyethanol ("3-MBDGE"), (3,3-dimethylbutoxy ethoxyethanol ("3,3-DMBDGE"), cyclohexylmethyleneoxy ethoxyethanol (hereafter "CHMDGE"), 4-Methylpent-2-oxy ethoxyethanol ("MIBCDGE"), n-hexoxy ethoxyethanol (hereafter "n-HDGE"), 4-methylpentoxy ethoxyethanol ("4-MPDGE"), butoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol and ethoxy ethanol, n-methyl-2-pyrrolidone, dimethyl ethylene urea, and mixtures thereof.

Claim 24B. The method of claim 1B, wherein providing the polymer suspension comprises mixing the powder polymer into the water soluble solvent and wherein the weight ratio of powder polymer to water soluble solvent ranges from 30:70 to 70:30.

Claim 25B. The method of claim 24B, wherein the weight ratio of powder polymer to water soluble solvent ranges from 40:60 to 60:40.

Claim 26B. The method of claim 1B, wherein the wellbore is an injection wellbore associated with an injection well, and the method further comprising:
providing a production well spaced apart from the injection well a predetermined distance and having a production wellbore in fluid communication with the subterranean reservoir,
wherein the injection of the injection solution increases flow of hydrocarbons to the production wellbore.

Claim 27B. The method of claim 1B, wherein the wellbore is a hydraulic fracturing wellbore associated with a hydraulic fracturing well.

Claim 28B. The method of claim 1B, wherein the injection solution functions as a drag reducer.

Claim 29B. The method of claim 1B, wherein the injection solution is included in a hydraulic fracturing fluid.

Claim 30B. The method of claim 1B, wherein the injection solution is used as a hydraulic fracturing fluid.

Claim 31B. A method of enhancing oil recovery in a subterranean reservoir, the method comprising injecting an injection solution into the subterranean reservoir, whereby the injection solution is prepared by
mixing a powder polymer having an average molecular weight about 0.5 to 30 Million Daltons with a water soluble solvent having an HLB of greater than or equal to 8 at a weight ratio of powder polymer to water soluble solvent ranging from 20:80 to 80:20, generating a stable and substantially anhydrous polymer suspension; the water soluble solvent is selected from the group of surfactants, glycol ethers, alcohols, co-solvents, and mixtures thereof; the powder polymer is selected from the group of polyacrylamides, partially hydrolyzed polyacrylamides, hydrophobically-modified associative polymers, 2-acrylamido 2-methylpropane sulfonic acid and salts thereof, N-vinyl pyrrolidone, polyacrylic acid, polyvinyl alcohol, biopolymers, synthetic polymers, and mixtures thereof;
mixing a sufficient amount of the polymer suspension into an aqueous fluid for the polymer to be hydrated resulting in an injection solution containing a polymer concentration ranging from 100 ppm to 50,000 ppm in less than or equal to 4 hours;
wherein the injection solution has a filter ratio of less than or equal to 1.5 at 15 psi using a 1.2 μm filter and a NTU of less than or equal to 20.

Claim Set N

Claim 1N. An injection solution for injecting into a subterranean reservoir to enhance production and recovery of oil from the reservoir, the injection solution is prepared by mixing a sufficient amount of a pumpable, stable and substantially anhydrous polymer suspension in an aqueous fluid for the polymer to be hydrated in less than or equal to 4 hours, resulting in the injection solution containing a polymer concentration ranging from 100 ppm to 50,000 ppm; the injection solution has a filter ratio of less than or equal to 1.5 at 15 psi using a 1.2 μm filter;
wherein the polymer suspension comprises a powder polymer having an average molecular weight of 0.5 to 30 Million Daltons suspended in a water soluble solvent having an HLB of greater than or equal to 8 and selected from the group of surfactants, glycol ethers, alcohols, co-solvents, and mixtures thereof, at a weight ratio of powder polymer to water soluble solvent ranging from 20:80 to 80:20;
wherein the aqueous fluid selected from any of surface water, water recovered from a production well, sea water, synthetic water, produced reservoir brine, reservoir brine, fresh water, produced water, water, saltwater, brine, synthetic brine, synthetic seawater brine, and mixtures thereof.

Claim 2N. The injection solution of claim 1N, wherein the water soluble solvent comprises a mixture of non-ionic and anionic surfactants.

Claim 3N. The injection solution of claim 1N, wherein the powder polymer is a biopolymer that is a polysaccharide.

Claim 4N. The injection solution of claim 1N, wherein the powder polymer is a biopolymer or a synthetic polymer.

Claim 5N. The injection solution of claim 1N, wherein the powder polymer is a synthetic polymer selected from the group of polyacrylamides, partially hydrolyzed polyacrylamides, hydrophobically-modified associative polymers, 2-acrylamido 2-methylpropane sulfonic acid and salts thereof, N-vinyl pyrrolidone, polyacrylic acid, polyvinyl alcohol, and mixtures thereof.

Claim 6N. The injection solution of claim 1N, wherein the water soluble solvent is selected from isopropyl alcohol (IPA), n-propyl alcohol, isobutyl alcohol (IBA), methylisobutyl alcohol, secondary butyl alcohol (SBA), ethylene glycol monobutyl ether, diethylene glycol monobutyl ether, triethylene glycol monobutyl ether, and mixtures thereof.

Claim 7N. The injection solution of claim 1N, wherein the water soluble solvent is selected from ethoxylated surfactants, nonylphenol ethoxylates, alcohol ethoxylates, internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, alkyl sulfonate, α-olefin sulfonates (AOS), dihexyl sulfosuccinates, alkylpolyalkoxy sulfates, sulfonated amphoteric surfactants, and mixtures thereof.

Claim 8N. The injection solution of claim 1N, wherein the water soluble solvent is a co-solvent selected from the group of an ionic surfactant, non-ionic surfactant, anionic surfactant, cationic surfactant, nonionic surfactant, amphoteric surfactant, ketones, esters, ethers, glycol ethers, glycol ether esters, lactams, cyclic ureas, alcohols, aromatic hydrocarbons, aliphatic hydrocarbons, alicyclic hydrocarbons, nitroalkanes, unsaturated hydrocarbons, halocarbons, surfactants commonly used for enhanced oil recovery applications, alkyl aryl sulfonates (AAS), a-olefin sulfonates (AOS), internal olefin sulfonates (IOS), alcohol ether sulfates derived from propoxylated $C_{12}$-$C_{20}$ alcohols, ethoxylated alcohols, mixtures of an alcohol and an ethoxylated alcohol, mixtures of anionic and cationic surfactants, disulfonated surfactants, aromatic ether polysulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, primary amines, secondary amines, tertiary amines, quaternary ammonium cations, cationic surfactants that are linked to a terminal sulfonate or carboxylate group, alkyl aryl alkoxy alcohols, alkyl alkoxy alcohols, alkyl alkoxylated esters, alkyl polyglycosides, alkoxy ethoxyethanol compounds, isobutoxy ethoxyethanol ("iBDGE"), n-pentoxy ethoxyethanol ("n-PDGE"), 2-methylbutoxy ethoxyethanol ("2-MBDGE"), methylbutoxy ethoxyethanol ("3-MBDGE"), (3,3-dimethylbutoxy ethoxyethanol ("3,3-DMBDGE"), cyclohexylmethyleneoxy ethoxyethanol (hereafter "CHMDGE"), 4-Methylpent-2-oxy ethoxyethanol ("MIBCDGE"), n-hexoxy ethoxyethanol (hereafter "n-HDGE"), 4-methylpentoxy ethoxyethanol ("4-MPDGE"), butoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol and ethoxy ethanol, n-methyl-2-pyrrolidone, dimethyl ethylene urea, and mixtures thereof.

Claim 9N. The injection solution of claim 1N, wherein the water soluble solvent comprises a mixture of non-ionic and anionic surfactants, and wherein the anionic surfactant is present in an amount of less than or equal to 5 wt. % as a stabilizer.

Claim 10N. The injection solution of claim 1N, wherein the polymer suspension comprises a powder polymer suspended in a water soluble solvent at a weight ratio of powder polymer to water soluble solvent ranging from 30:70 to 70:30.

Claim 11N. The injection solution of claim 10N, wherein the polymer suspension comprises a powder polymer suspended in a water soluble solvent at a weight ratio of powder polymer to water soluble solvent ranging from 40:60 to 60:40.

Claim 12N. The injection solution of claim 1N, wherein the injection solution is prepared by mixing the pumpable, stable and substantially anhydrous polymer suspension in an aqueous fluid in less than or equal to 2 hours.

Claim 13N. The injection solution of claim 12N, wherein the injection solution is prepared by mixing the pumpable, stable and substantially anhydrous polymer suspension in an aqueous fluid in less than or equal to 1 hour.

Claim 14N. The injection solution of claim 1N, wherein the injection solution is prepared by mixing the pumpable, stable and substantially anhydrous polymer suspension in a mixing tank or via an in-line static mixer.

Claim 15N. The injection solution of claim 1N, wherein the injection solution has a filter ratio of less than or equal to 1.2 at 15 psi using a 1.2 μm filter.

Claim 16N. The injection solution of claim 1N, wherein the injection solution has a NTU of less than or equal to 20.

Claim 17N. The injection solution of claim 16N, wherein the injection solution has a NTU of less than or equal to 15.

Claim 18N. The injection solution of claim 17N, wherein the injection solution has a NTU of less than or equal to 10.

Claim 19N. The injection solution of claim 1N, wherein after the powder polymer is suspended in the water soluble solvent for a period of at least 2 hours with a turbidity decrease of at least 25%.

Claim 20N. The injection solution of claim 19N, wherein after the powder polymer is suspended in the water soluble solvent for a period of at least 2 hours with a turbidity decrease of at least 50%.

Claim 21N. The injection solution of claim 20N, wherein after the powder polymer is suspended in the water soluble solvent for a period of at least 2 hours with a turbidity decrease of at least 75%.

Claim 22N. The injection solution of claim 1N, wherein the polymer in the injection solution has an average particle size ranging from 0.01 to 10 μm.

Claim Set C

Claim 1C. A method for making a polymer suspension for use in enhancing the production of oil from a formation, the method comprising mixing a powder polymer having an average molecular weight of 0.5 to 30 Million Daltons into a water soluble solvent having an HLB of greater than or equal to 8 for less than or equal to 24 hours, the water soluble solvent is selected from the group of surfactants, glycol ethers, alcohols, co-solvents, and mixtures thereof, at a weight ratio of powder polymer to water soluble solvent ranging from 20:80 to 80:20;

wherein the polymer suspension is stable, pumpable, and substantially anhydrous; and wherein the polymer suspension is hydrated for an injection solution in less than or equal to 4 hours, containing a polymer concentration ranging from 100 ppm to 50,000 ppm and having a filter ratio of less than or equal to 1.5 at 15 psi using a 1.2 µm filter, by mixing a sufficient amount of the polymer suspension in an aqueous fluid.

Claim 2C. The method of claim 1C, wherein the mixing of a sufficient amount of the polymer suspension in the aqueous fluid is via a mixing tank or an in-line mixer.

Claim 3C. The method of claim 1C, wherein the polymer suspension is hydrated in less than or equal to 2 hours by mixing of a sufficient amount of the polymer suspension in the aqueous fluid.

Claim 4C. The method of claim 3C, wherein the polymer suspension is hydrated in less than or equal to 1 hours by mixing of a sufficient amount of the polymer suspension in the aqueous fluid.

Claim 5C. The method of claim 1C, wherein the mixing of a sufficient amount of the polymer suspension in the aqueous fluid resulting an injection solution having a filter ratio of less than or equal to 1.2 at 15 psi using a 1.2 µm filter.

Claim 6C. The method of claim 5C, wherein the mixing of a sufficient amount of the polymer suspension in the aqueous fluid resulting an injection solution having a filter ratio of less than or equal to 1.05 at 15 psi using a 1.2 µm filter.

Claim 7C. The method of claim 1C, wherein the mixing of a sufficient amount of the polymer suspension in the aqueous fluid resulting an injection solution having a NTU of less than or equal to 20.

Claim 8C. The method of claim 7C, wherein the mixing of a sufficient amount of the polymer suspension in the aqueous fluid resulting an injection solution having a NTU of less than or equal to 15.

Claim 9C. The method of claim 8C, wherein the mixing of a sufficient amount of the polymer suspension in the aqueous fluid resulting an injection solution having a NTU of less than or equal to 10.

Claim 10C. The method of claim 1C, wherein after the powder polymer is suspended in the water soluble solvent for a period of at least 2 hours with a turbidity decrease of at least 25%.

Claim 11C. The method of claim 10C, wherein after the powder polymer is suspended in the water soluble solvent for a period of at least 2 hours with a turbidity decrease of at least 50%.

Claim 12C. The method of claim 11C, wherein after the powder polymer is suspended in the water soluble solvent for a period of at least 2 hours with a turbidity decrease of at least 75%.

Claim 13C. The method of claim 1C, wherein the mixing of the powder polymer having an average molecular weight of 0.5 to 30 Million Daltons into the water soluble solvent having an HLB greater than or equal to 8 is for less than or equal to 4 hours.

Claim 14C. The method of claim 13C, wherein the mixing of the powder polymer having an average molecular weight of 0.5 to 30 Million Daltons into the water soluble solvent having an HLB greater than or equal to 8 is for less than or equal to 2 hour.

Claim 15C. The method of claim 14C, wherein the mixing of the powder polymer having an average molecular weight of 0.5 to 30 Million Daltons into the water soluble solvent having an HLB greater than or equal to 8 is for less than or equal to 1 hour.

Claim 16C. The method of claim 1C, wherein providing the powder polymer is a biopolymer that is a polysaccharides.

Claim 17C. The method of claim 1C, wherein providing the powder polymer is a biopolymer or a synthetic polymer.

Claim 18C. The method of claim 1C, wherein the powder polymer is a synthetic polymer selected from the group of polyacrylamides, partially hydrolyzed polyacrylamides, hydrophobically-modified associative polymers, 2-acrylamido 2-methylpropane sulfonic acid and salts thereof, N-vinyl pyrrolidone, polyacrylic acid, polyvinyl alcohol, and mixtures thereof.

Claim 19C. The method of claim 1C, wherein water soluble solvent is selected from isopropyl alcohol (IPA), n-propyl alcohol, isobutyl alcohol (IBA), methyl-isobutyl alcohol, secondary butyl alcohol (SBA), ethylene glycol monobutyl ether, diethylene glycol monobutyl ether, triethylene glycol monobutyl ether, and mixtures thereof.

20C. The method of claim 1C, wherein the water soluble solvent is an ionic surfactant selected from ethoxylated surfactants, nonylphenol ethoxylates, alcohol ethoxylates, internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, alkyl sulfonate, α-olefin sulfonates (AOS), dihexyl sulfosuccinates, alkylpolyalkoxy sulfates, sulfonated amphoteric surfactants, and mixtures thereof.

Claim 21C. The method of claim 1, wherein the water soluble solvent is a co-solvent selected from the group of an ionic surfactant, non-ionic surfactant, anionic surfactant, cationic surfactant, nonionic surfactant, amphoteric surfactant, ketones, esters, ethers, glycol ethers, glycol ether esters, lactams, cyclic ureas, alcohols, aromatic hydrocarbons, aliphatic hydrocarbons, alicyclic hydrocarbons, nitroalkanes, unsaturated hydrocarbons, halocarbons, surfactants commonly used for enhanced oil recovery applications, alkyl aryl sulfonates (AAS), a-olefin sulfonates (AOS), internal olefin sulfonates (IOS), alcohol ether sulfates derived from propoxylated $C_2$-$C_{20}$ alcohols, ethoxylated alcohols, mixtures of an alcohol and an ethoxylated alcohol, mixtures of anionic and cationic surfactants, disulfonated surfactants, aromatic ether polysulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, primary amines, secondary amines, tertiary amines, quaternary ammonium cations, cationic surfactants that are linked to a terminal sulfonate or carboxylate group, alkyl aryl alkoxy alcohols, alkyl alkoxy alcohols, alkyl alkoxylated esters, alkyl polyglycosides, alkoxy ethoxyethanol compounds, isobutoxy ethoxyethanol ("iBDGE"), n-pentoxy ethoxyethanol ("n-PDGE"), 2-methylbutoxy ethoxyethanol ("2-MBDGE"), methylbutoxy ethoxyethanol ("3-MBDGE"), (3,3-dimethylbutoxy ethoxyethanol ("3,3-DMBDGE"), cyclohexylmethyleneoxy ethoxyethanol (hereafter "CHMDGE"), 4-Methylpent-2-oxy ethoxyethanol ("MIBCDGE"), n-hexoxy ethoxyethanol (hereafter "n-HDGE"), 4-methylpentoxy ethoxyethanol ("4-MPDGE"), butoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol and ethoxy ethanol, n-methyl-2-pyrrolidone, dimethyl ethylene urea, and mixtures thereof, Claim 22C. The method of claim 1C, wherein the water soluble solvent comprises a mixture of non-ionic and anionic surfactants.

Claim 23C. The method of claim 22C, wherein the anionic surfactant is present in an amount of less than or equal to 5 wt. % as a stabilizer.

Claim 24C. The method of claim 1C, wherein the weight ratio of powder polymer to water soluble solvent ranges from 30:70 to 70:30.

Claim 25C. The method of claim 24C, wherein the weight ratio of powder polymer to water soluble solvent ranges from 40:60 to 60:40.

Claim 26C. The method of claim 1C, wherein the polymer suspension is hydrated in less than or equal to 4 hours for an injection solution containing has an average particle size ranging from 0.01 to 10 µm.

The invention claimed is:

1. A polymer composition for use in enhancing the production of oil from a formation, the composition comprising:
   a powder polymer having an average molecular weight of 0.5 to 30 Million Daltons suspended in a water soluble solvent at a weight ratio of powder polymer to water soluble solvent ranging from 20:80 to 80:20, wherein the water soluble solvent has a HLB of greater than or equal to 8 and comprises a mixture of non-ionic and anionic surfactants; and
   wherein the polymer composition contains less than or equal to 3 wt. % water;
   wherein the polymer composition is hydrated in an aqueous fluid for an injection solution in less than or equal to 4 hours containing a polymer concentration ranging from 100 ppm to 50,000 ppm and having a filter ratio of less than or equal to 1.5 at 15 psi using a 1.2 µm filter.

2. The polymer composition of claim 1, wherein the polymer composition is hydrated in an aqueous fluid for an injection solution in less than or equal to 2 hours.

3. The polymer composition of claim 2, wherein the polymer composition is hydrated in an aqueous fluid for an injection solution in less than or equal to 1 hour.

4. The polymer composition of claim 1, wherein the polymer composition is hydrated in an aqueous fluid for an injection solution in less than or equal to 2 hours and having a filter ratio of less than or equal to 1.2 at 15 psi using a 1.2 µm filter.

5. The polymer composition of claim 4, wherein the polymer composition is hydrated in an aqueous fluid for an injection solution in less than or equal to ½ hour and having a filter ratio of less than or equal to 1.05 at 15 psi using a 1.2 µm filter.

6. The polymer composition of claim 1, wherein the polymer composition is hydrated in an aqueous fluid for an injection solution in less than or equal to 4 hours, and having a turbidity of less than or equal to 20 NTU.

7. The polymer composition of claim 6, wherein the polymer composition is hydrated in an aqueous fluid in less than or equal to 1 hour for an injection solution having a turbidity of less than or equal to 15 NTU.

8. The polymer composition of claim 7, wherein the polymer composition is hydrated in an aqueous fluid in less than or equal to 1 hour for an injection solution having a turbidity of less than or equal to 10 NTU.

9. The polymer composition of claim 1, wherein the polymer composition is stable.

10. The polymer composition of claim 1, where the polymer composition is characterized has having a turbidity decrease of at least 25% after the powder polymer is suspended in the water soluble solvent for a period of at least 2 hours.

11. The polymer composition of claim 10, where the polymer composition is characterized has having a turbidity decrease of at least 50% after the powder polymer is suspended in the water soluble solvent for a period of at least 2 hours.

12. The polymer composition of claim 11, where the polymer composition is characterized has having a turbidity decrease of at least 75% after the powder polymer is suspended in the water soluble solvent for a period of at least 2 hours.

13. The polymer composition of claim 1, wherein the polymer composition is hydrated in an aqueous fluid by mixing a sufficient concentration of the polymer suspension in an aqueous fluid in a mixing tank or an in-line mixer in less than or equal to 4 hours for an injection solution containing a polymer concentration ranging from 100 ppm to 50,000 ppm.

14. The polymer composition of claim 13, wherein the polymer composition is hydrated in an aqueous fluid by mixing a sufficient concentration of the polymer suspension in an aqueous fluid in a mixing tank or an in-line mixer in less than or equal to 2 hours for an injection solution containing a polymer concentration ranging from 100 ppm to 50,000 ppm.

15. The polymer composition of claim 14, wherein the polymer composition is hydrated in an aqueous fluid by mixing a sufficient concentration of the polymer suspension in an aqueous fluid in a mixing tank or an in-line mixer in less than or equal to 1 hour for an injection solution containing a polymer concentration ranging from 100 ppm to 50,000 ppm.

16. The polymer composition of claim 1, wherein the polymer composition is pumpable.

17. The polymer composition of claim 16, wherein the polymer composition remains pumpable after the powder polymer is suspended in the water soluble solvent for more than or equal to 24 hours.

18. The polymer composition of claim 1, wherein the powder polymer is a biopolymer that is a polysaccharide.

19. The polymer composition of claim 1, wherein the powder polymer is a biopolymer or a synthetic polymer.

20. The polymer composition of claim 1, wherein the powder polymer is a synthetic polymer selected from the group of polyacrylamides, partially hydrolyzed polyacrylamides, hydrophobically-modified associative polymers, copolymers of polyacrylamide and one or both of 2-acrylamido 2-methylpropane sulfonic acid and salts thereof and N-vinyl pyrrolidone, single-, co-, or ter-polymers of N-vinyl pyrrolidones, polyacrylic acid, polyvinyl alcohol, and mixtures thereof.

21. The polymer composition of claim 1, wherein the anionic surfactant is present in an amount of less than or equal to 5 wt. % as a stabilizer.

22. The polymer composition of claim 1, wherein the water soluble solvent further comprises isopropyl alcohol (IPA), n-propyl alcohol, isobutyl alcohol (IBA), methyl-isobutyl alcohol, secondary butyl alcohol (SBA), ethylene glycol monobutyl ether, diethylene glycol monobutyl ether, triethylene glycol monobutyl ether, and mixtures thereof.

23. The polymer composition of claim 1, wherein the water soluble solvent is selected from ethoxylated surfactants, nonylphenol ethoxylates, alcohol ethoxylates, internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy] sulfates, alkyl sulfonate, a-olefin sulfonates (AOS), dihexyl sulfosuccinates, alkylpolyalkoxy sulfates, sulfonated amphoteric surfactants, and mixtures thereof.

24. The polymer composition of claim 1, wherein the water soluble solvent further comprises a co-solvent, wherein the co-solvent is selected from the group of an ionic surfactant, non-ionic surfactant, anionic surfactant, cationic surfactant, nonionic surfactant, amphoteric surfactant, ketones, esters, ethers, glycol ethers, glycol ether esters, lactams, cyclic ureas, alcohols, aromatic hydrocarbons, aliphatic hydrocarbons, alicyclic hydrocarbons, nitroalkanes, unsaturated hydrocarbons, halocarbons, alkyl aryl sulfonates (AAS), a-olefin sulfonates (AOS), internal olefin sulfonates (IOS), alcohol ether sulfates derived from propoxylated $Ci_2$-$C_2$o alcohols, ethoxylated alcohols, mixtures of an alcohol and an ethoxylated alcohol, mixtures of anionic and cationic surfactants, disulfonated surfactants, aromatic ether polysulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, primary amines, secondary amines, tertiary amines, quaternary ammonium cations, cationic surfactants that are linked to a terminal sulfonate or carboxylate group, alkyl aryl alkoxy alcohols, alkyl alkoxy alcohols, alkyl alkoxylated esters, alkyl polyglycosides, alkoxy ethoxyethanol compounds, isobutoxy ethoxyethanol ("iBDGE"), n-pentoxy ethoxyethanol ("n-PDGE"), 2-methylbutoxy ethoxyethanol ("2-MBDGE"), methylbutoxy ethoxyethanol ("3-MBDGE"), (3,3-dimethylbutoxy ethoxyethanol ("3,3-DMBDGE"), cyclohexylmethyleneoxy ethoxyethanol (hereafter "CHMDGE"), 4-Methylpent-2-oxy ethoxyethanol ("MIBCDGE"), n-hexoxy ethoxyethanol (hereafter "n-HDGE"), 4-methylpentoxy ethoxyethanol ("4-MPDGE"), butoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol and ethoxy ethanol, n-methyl-2-pyrrolidone, dimethyl ethylene urea, and mixtures thereof.

25. A polymer composition for use in enhancing the production of oil from a formation, the composition consisting essentially of a powder polymer having an average molecular weight of 0.5 to 30 Million Daltons selected from the group of polyacrylamides, partially hydrolyzed polyacrylamides, hydrophobically-modified associative polymers, copolymers of polyacrylamide and one or both of 2-acrylamido 2-methylpropane sulfonic acid and salts thereof and N-vinyl pyrrolidone, biopolymers, synthetic polymers, single-, co-, or ter-polymers of N-vinyl pyrrolidones, polyacrylic acid, polyvinyl alcohol, and mixtures thereof; suspended in a water soluble solvent at a weight ratio of powder polymer to water soluble solvent ranging from 30:70 to 70:30, wherein the water soluble solvent has a HLB of greater than or equal to 8 and comprises a mixture of non-ionic and anionic surfactants;
   wherein the polymer composition contains less than or equal to 3 wt. % water; and
   wherein the polymer composition is hydrated in an aqueous fluid in less than or equal to 4 hours for an injection solution containing a polymer concentration ranging from 100 ppm to 50,000 ppm and having a filter ratio of less than or equal to 1.5 at 15 psi using a 1.2 µm filter.

26. The polymer composition of claim 1, wherein the water soluble solvent further comprises a glycol ether, an alcohol, a co-solvent, and mixtures thereof.

27. The polymer composition of claim 25, wherein the water soluble solvent further comprises a glycol ether, an alcohol, a co-solvent, and mixtures thereof.

28. The polymer composition of claim 1, wherein the non-ionic surfactant is selected from ethoxylated surfactants, nonylphenol ethoxylates, alcohol ethoxylates, and mixtures thereof; or
   wherein the anionic surfactant is selected from internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, alkyl sulfonate, a-olefin sulfonates (AOS), dihexyl sulfosuccinates, alkylpolyalkoxy sulfates, sulfonated amphoteric surfactants, and mixtures thereof.

29. The polymer composition of claim 25, wherein the water soluble solvent is selected from ethoxylated surfactants, nonylphenol ethoxylates, alcohol ethoxylates, internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy] sulfates, alkyl sulfonate, a-olefin sulfonates (AOS), dihexyl sulfosuccinates, alkylpolyalkoxy sulfates, sulfonated amphoteric surfactants, and mixtures thereof.

30. The polymer composition of claim 25, wherein the water soluble solvent further comprises a co-solvent, wherein the co-solvent is selected from the group of an ionic surfactant, non-ionic surfactant, anionic surfactant, cationic surfactant, nonionic surfactant, amphoteric surfactant, ketones, esters, ethers, glycol ethers, glycol ether esters, lactams, cyclic ureas, alcohols, aromatic hydrocarbons, aliphatic hydrocarbons, alicyclic hydrocarbons, nitroalkanes, unsaturated hydrocarbons, halocarbons, alkyl aryl sulfonates (AAS), a-olefin sulfonates (AOS), internal olefin sulfonates (IOS), alcohol ether sulfates derived from propoxylated $Ci_2$-$C_2$o alcohols, ethoxylated alcohols, mixtures of an alcohol and an ethoxylated alcohol, mixtures of anionic and cationic surfactants, disulfonated surfactants, aromatic ether polysulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, primary amines, secondary amines, tertiary amines, quaternary ammonium cations, cationic surfactants that are linked to a terminal sulfonate or carboxylate group, alkyl aryl alkoxy alcohols, alkyl alkoxy alcohols, alkyl alkoxylated esters, alkyl polyglycosides, alkoxy ethoxyethanol compounds, isobutoxy ethoxyethanol ("iBDGE"), n-pentoxy ethoxyethanol ("n-PDGE"), 2-methylbutoxy ethoxyethanol ("2-MBDGE"), methylbutoxy ethoxyethanol ("3-MBDGE"), (3,3-dimethylbutoxy ethoxyethanol ("3,3-DMBDGE"), cyclohexylmethyleneoxy ethoxyethanol (hereafter "CHMDGE"), 4-Methylpent-2-oxy ethoxyethanol ("MIBCDGE"), n-hexoxy ethoxyethanol (hereafter "n-HDGE"), 4-methylpentoxy ethoxyethanol ("4-MPDGE"), butoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol and ethoxy ethanol, n-methyl-2-pyrrolidone, dimethyl ethylene urea, and mixtures thereof.

* * * * *